United States Patent
Hayashi

(10) Patent No.: US 9,958,660 B2
(45) Date of Patent: May 1, 2018

(54) IMAGING APPARATUS INCLUDING VARIABLE POWER RELAY OPTICAL SYSTEM

(71) Applicant: OLYMPUS CORPORATION, Shibuya-ku, Tokyo (JP)

(72) Inventor: Kazuhiro Hayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 22 days.

(21) Appl. No.: 14/738,188

(22) Filed: Jun. 12, 2015

(65) Prior Publication Data

US 2015/0373271 A1    Dec. 24, 2015

(30) Foreign Application Priority Data

Jun. 20, 2014    (JP) .................................. 2014-126855

(51) Int. Cl.
*G02B 21/02* (2006.01)
*G02B 15/16* (2006.01)

(52) U.S. Cl.
CPC ........... *G02B 21/025* (2013.01); *G02B 15/16* (2013.01)

(58) Field of Classification Search
CPC .... G02B 21/025; G02B 15/14; G02B 15/155; G02B 15/16; G02B 15/22; G02B 15/24
See application file for complete search history.

(56) References Cited

U.S. PATENT DOCUMENTS

| | | | |
|---|---|---|---|
| 3,045,545 A | 7/1962 | Korones et al. | |
| 5,194,886 A * | 3/1993 | Mukai | G02B 15/16 359/643 |
| 7,564,619 B2 | 7/2009 | Uzawa et al. | |
| 9,910,251 B2 | 3/2018 | Oe et al. | |
| 2006/0133793 A1* | 6/2006 | Goto | G03B 13/06 396/150 |
| 2008/0174861 A1 | 7/2008 | Uzawa et al. | |

(Continued)

FOREIGN PATENT DOCUMENTS

| DE | 102009004741 A1 | 7/2010 |
|---|---|---|
| EP | 2184633 A1 | 5/2010 |

(Continued)

OTHER PUBLICATIONS

Extended European Search Report dated Nov. 4, 2015, issued in counterpart European Application No. 15172104.0.

(Continued)

*Primary Examiner* — Cara Rakowski
(74) *Attorney, Agent, or Firm* — Holtz, Holtz & Volek PC

(57) ABSTRACT

A variable power relay optical system is arranged closer to an image side than an imaging optical system. The variable power relay optical system includes, in order from a side of the imaging optical system, a front group that is arranged between the imaging optical system and a position of an image of a sample that is formed by the imaging optical system, the front group forming an intermediate image formed by reducing the image, and a rear group that forms a relay image formed by magnifying the intermediate image, the rear group including a plurality of lens groups that each move along an optical axis so as to change magnification of the rear group without changing a distance from the front group to the relay image.

12 Claims, 26 Drawing Sheets

(56) References Cited

U.S. PATENT DOCUMENTS

| | | |
|---|---|---|
| 2010/0142037 A1 | 6/2010 | Nakayama |
| 2013/0148211 A1* | 6/2013 | Miyazawa ........... G02B 15/173 |
| | | 359/687 |
| 2014/0168763 A1 | 6/2014 | Winterot |
| 2014/0313589 A1* | 10/2014 | Winterot ................ G02B 13/22 |
| | | 359/663 |
| 2015/0268453 A1 | 9/2015 | Oe et al. |

FOREIGN PATENT DOCUMENTS

| | | |
|---|---|---|
| EP | 2899581 B1 | 8/2017 |
| JP | 2008134660 A | 6/2008 |
| JP | 2008170803 A | 7/2008 |
| JP | 2011150299 A | 8/2011 |
| JP | 2014048413 A | 3/2014 |
| JP | 2015179270 A | 10/2015 |
| WO | 2014045596 A1 | 3/2014 |

OTHER PUBLICATIONS

Japanese Office Action dated Mar. 27, 2018 issued in counterpart Japanese Application No. 2014-126855.

* cited by examiner

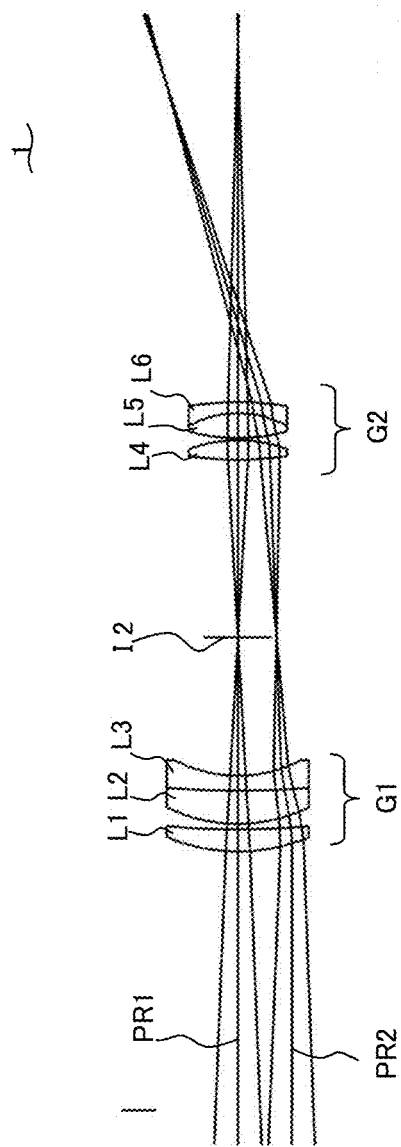
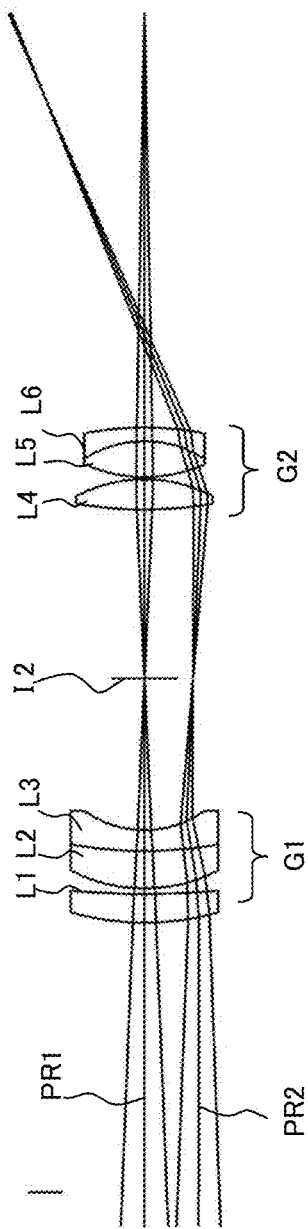
FIG. 2A
FIG. 2B

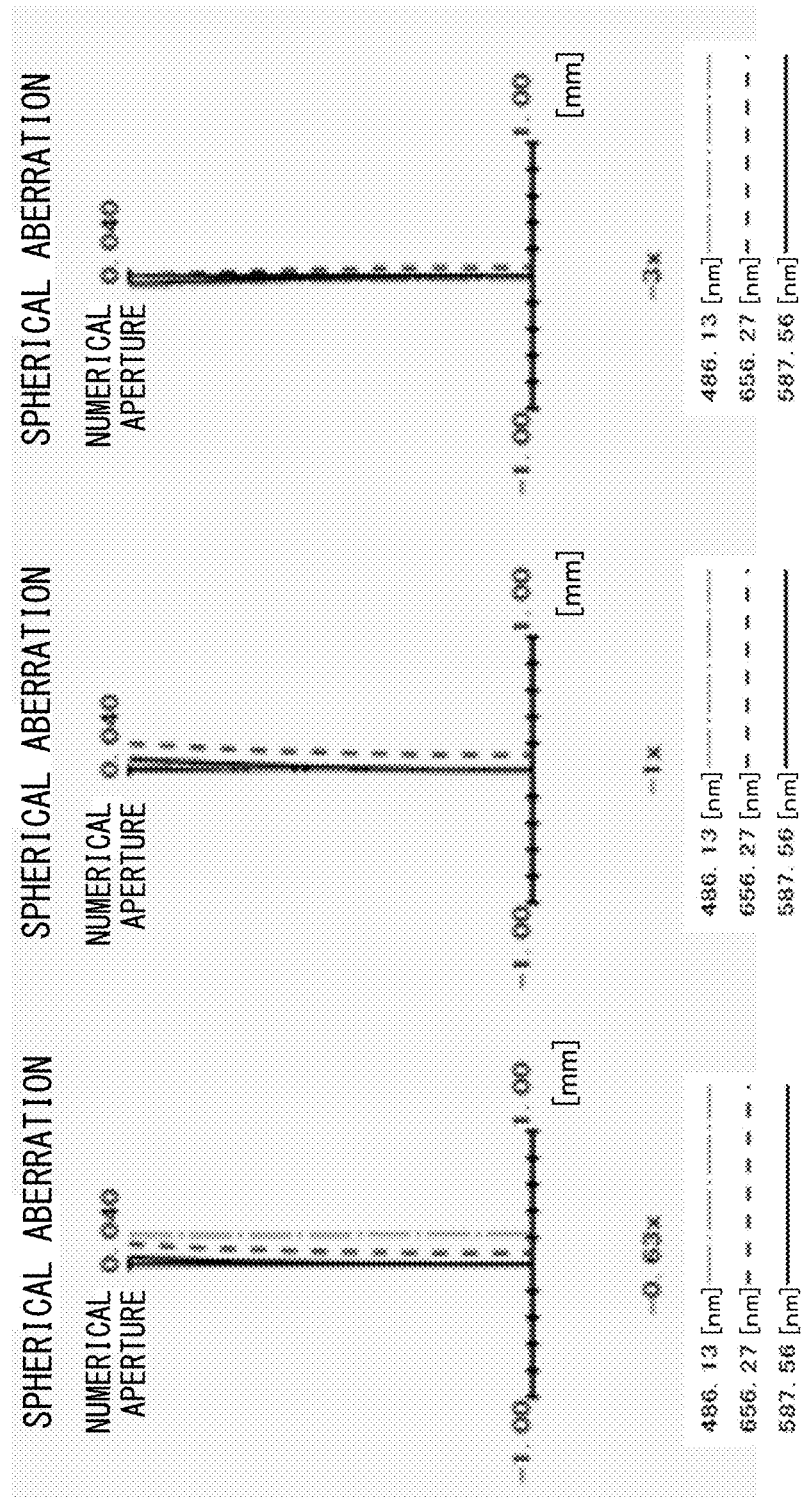

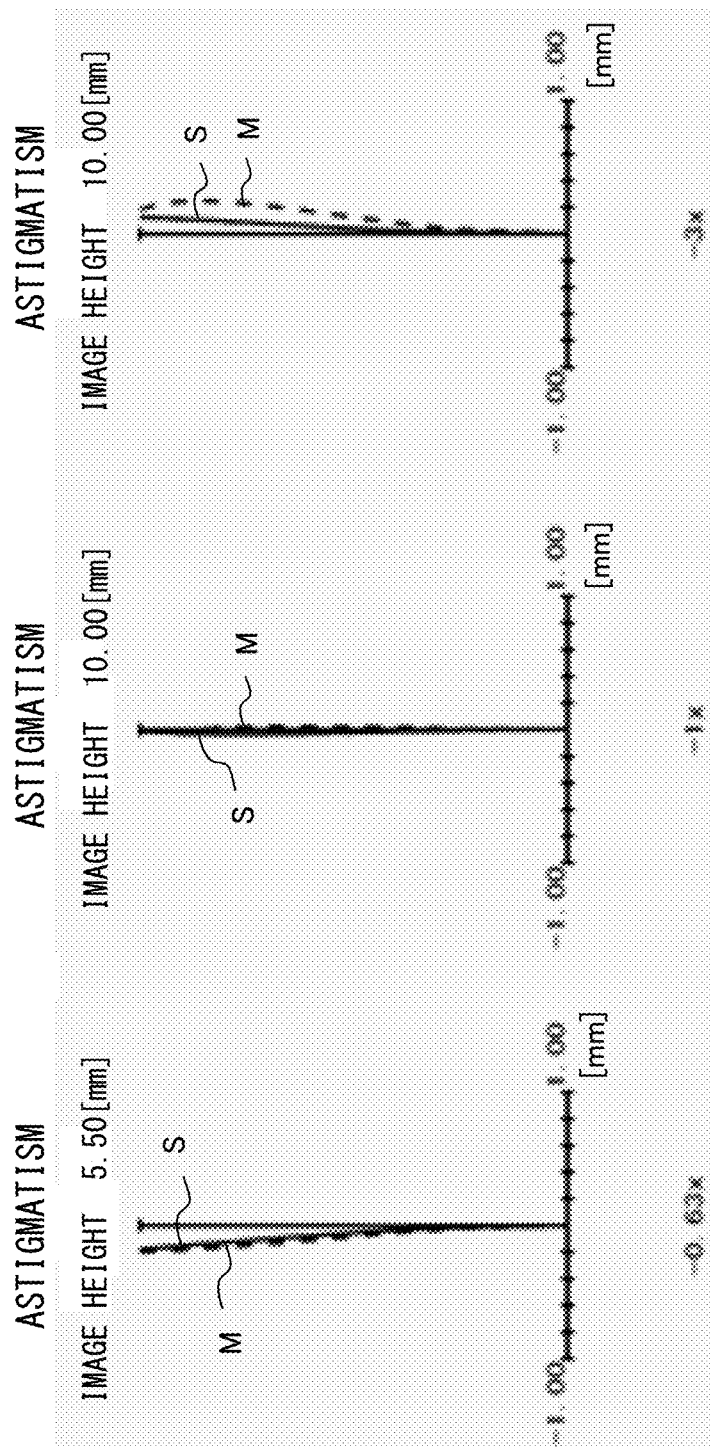

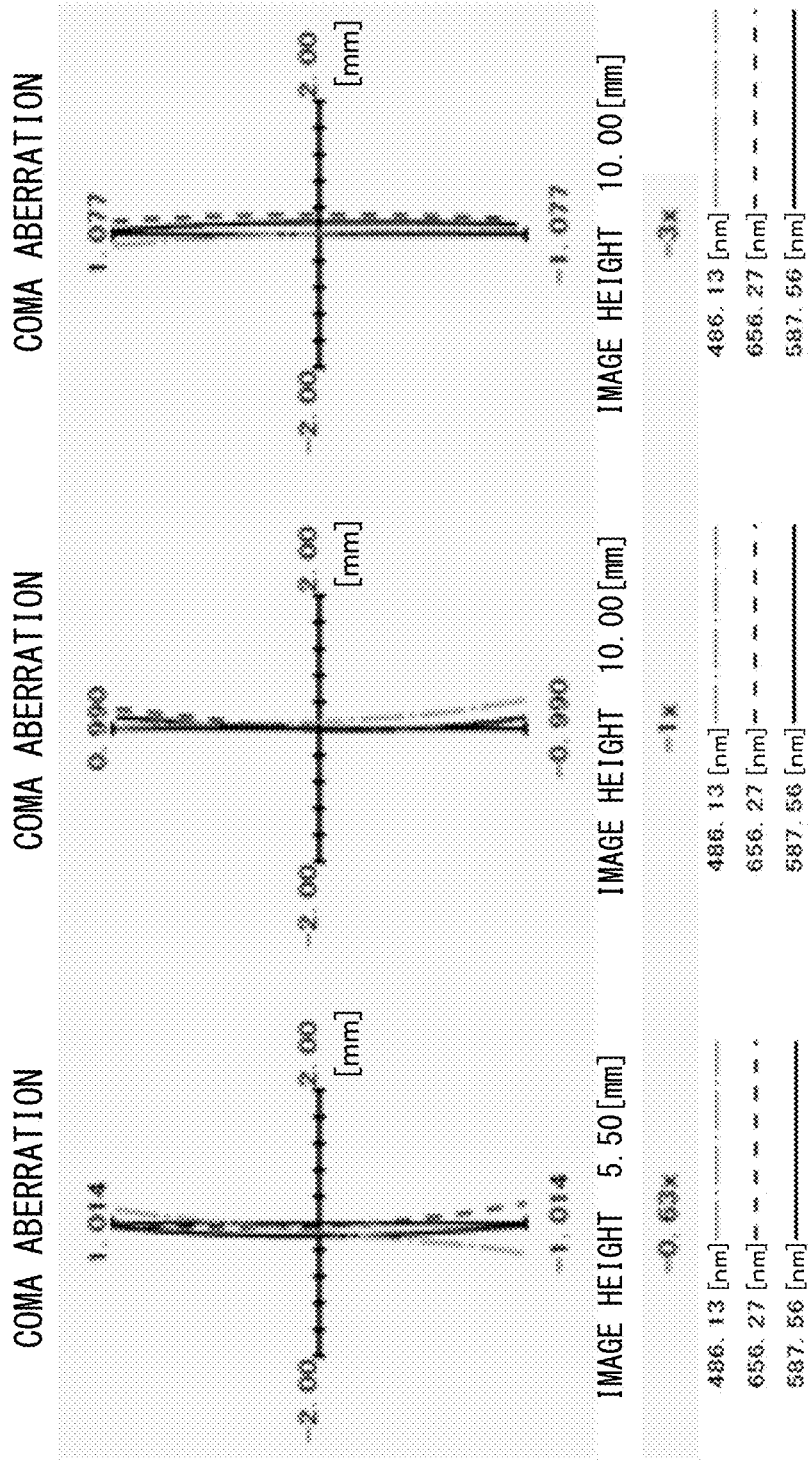

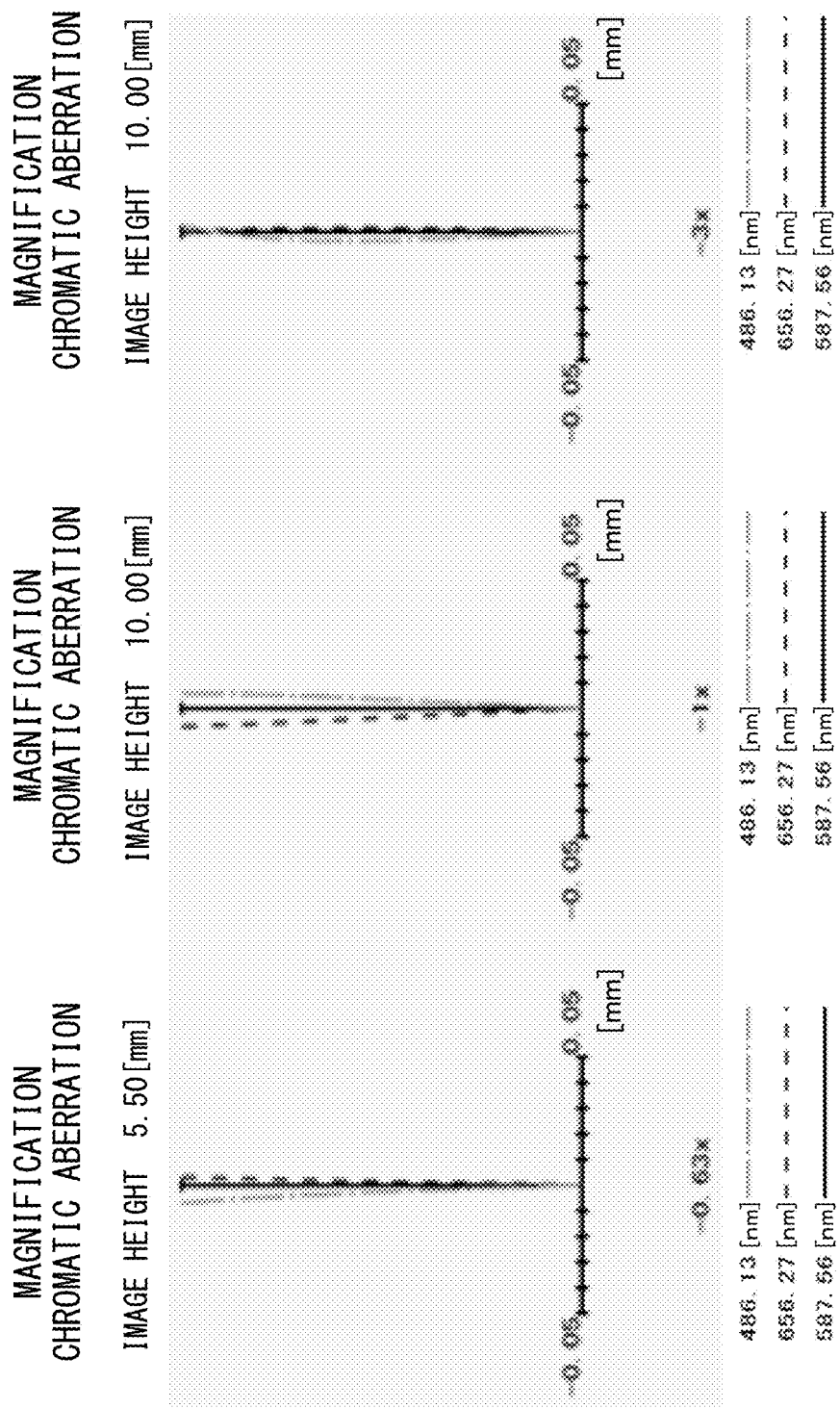

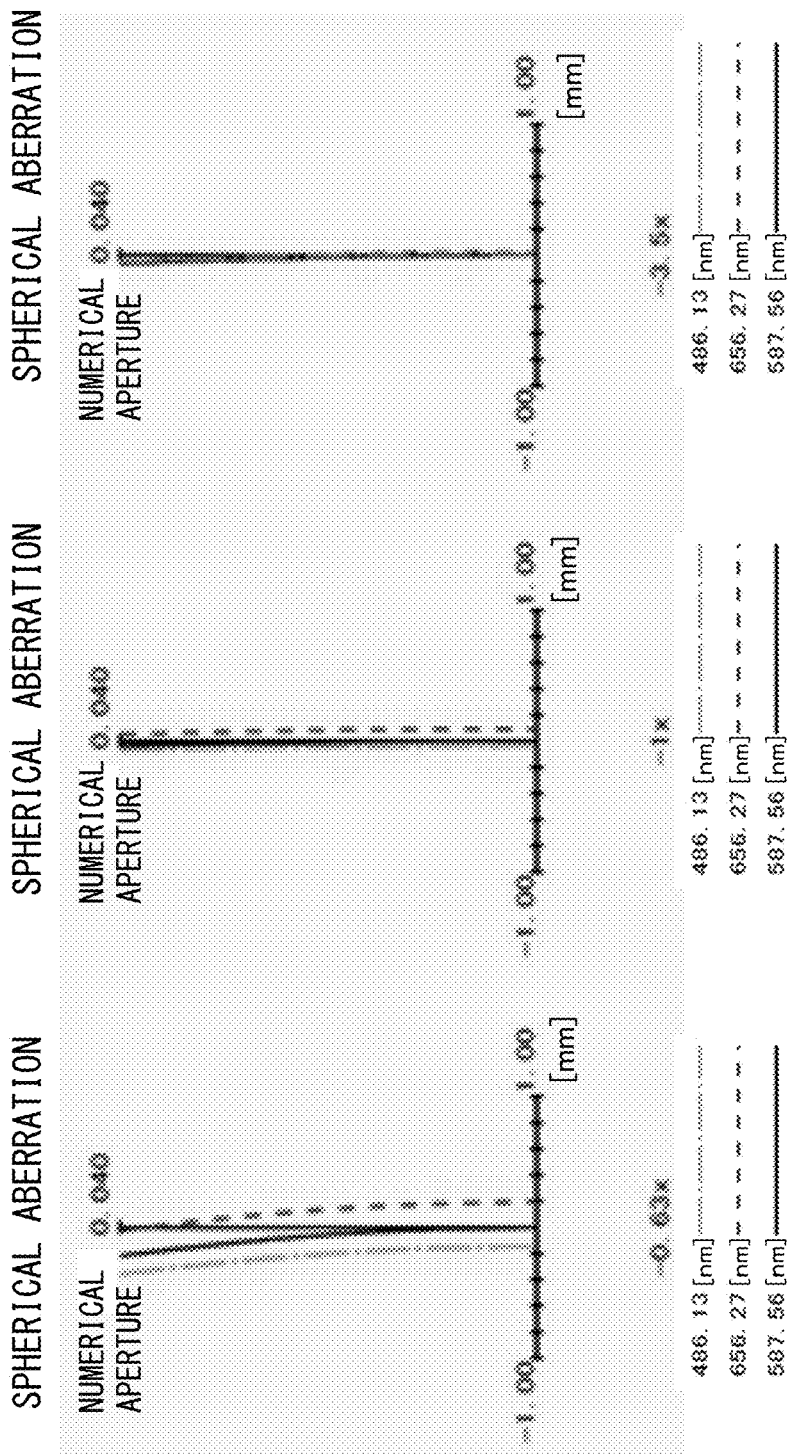

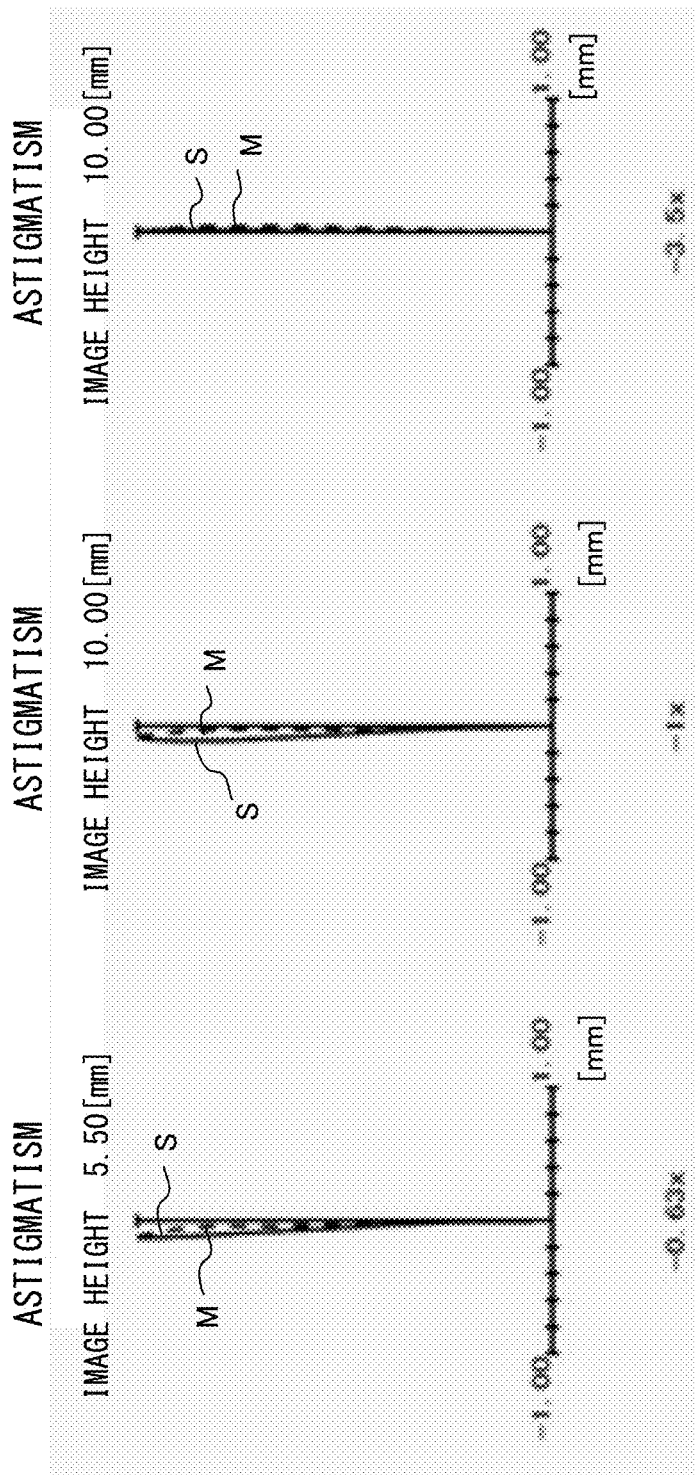

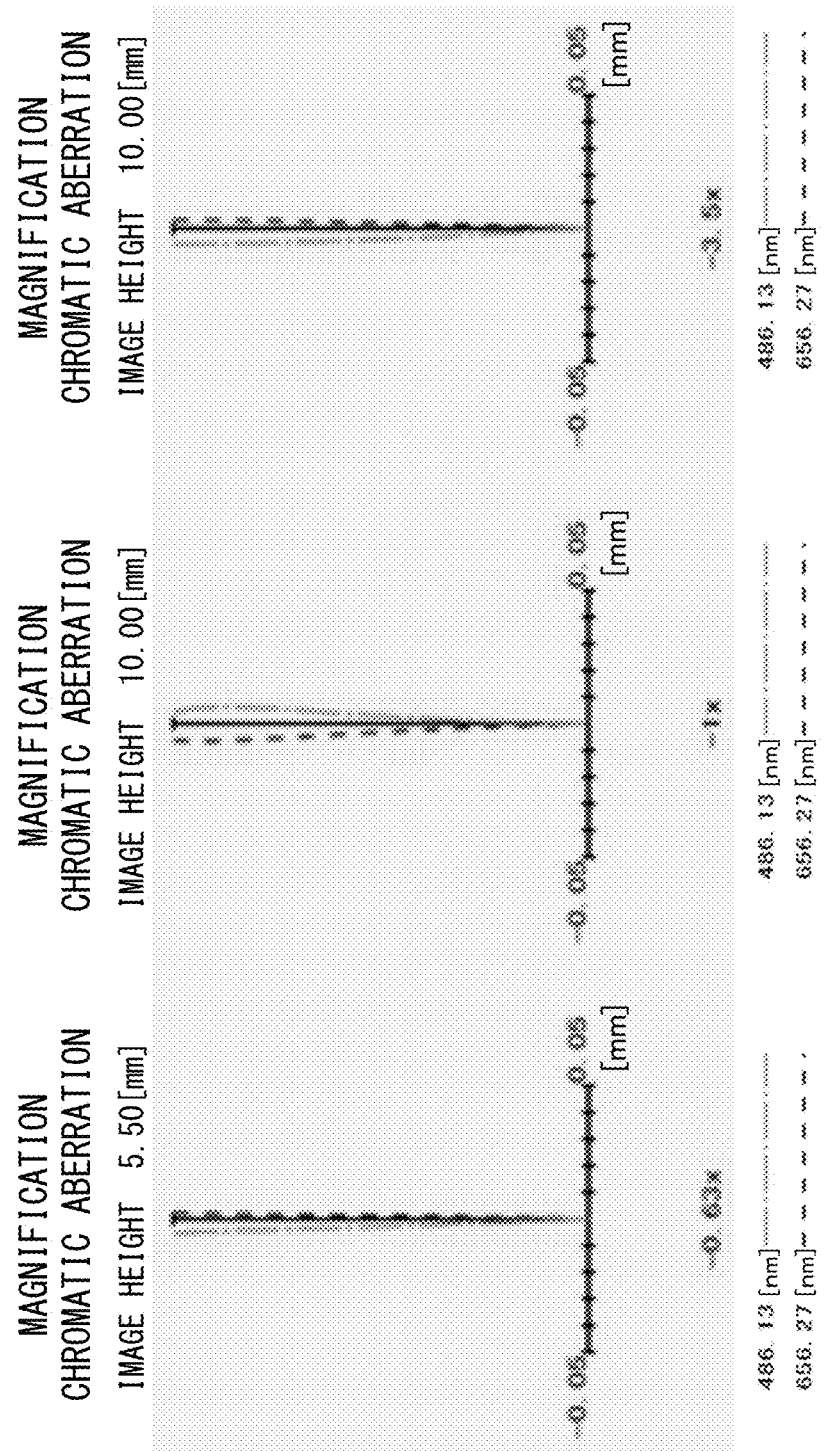

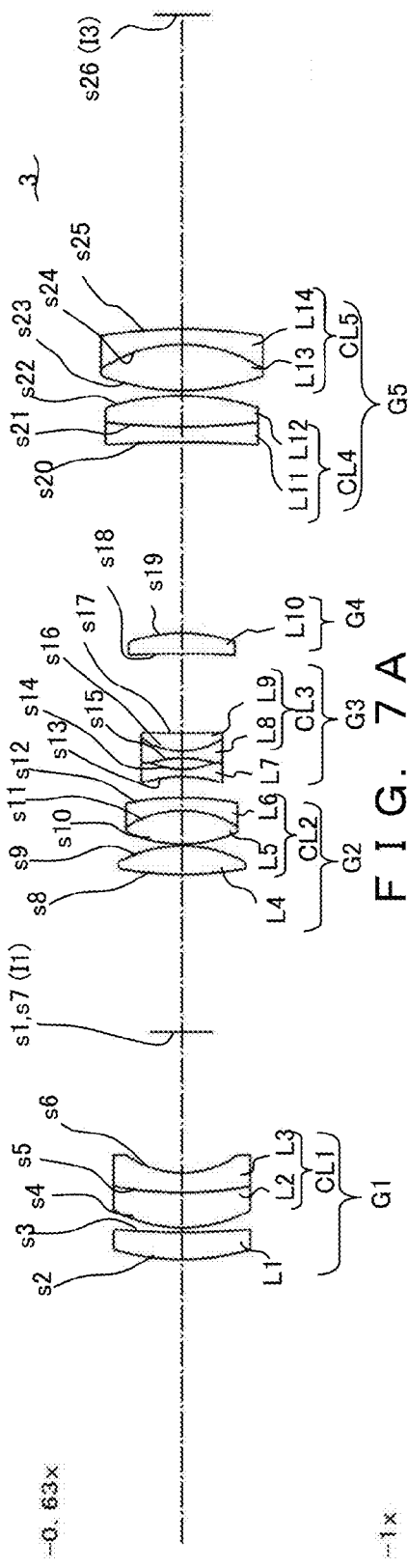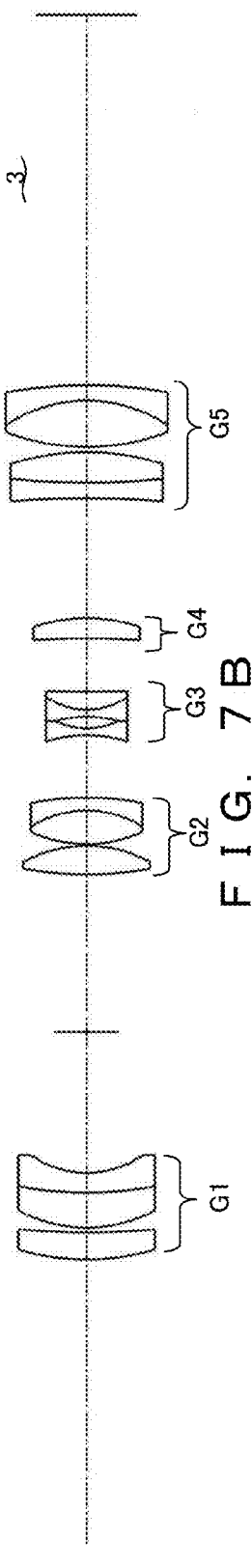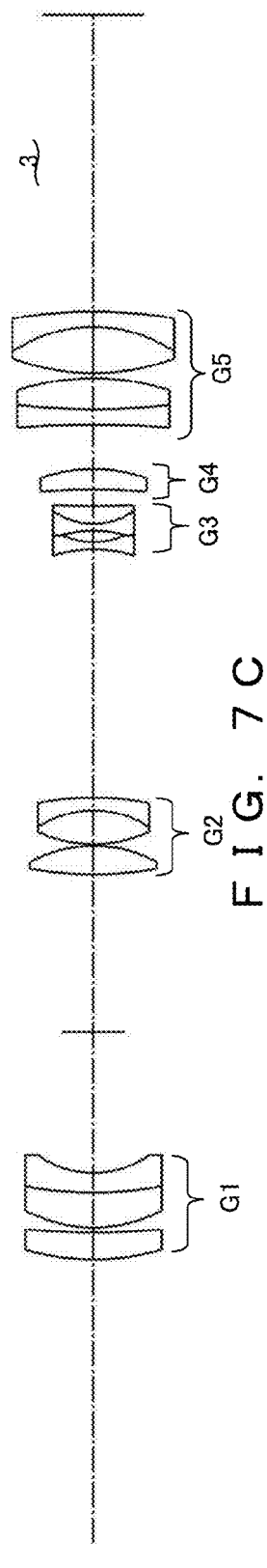

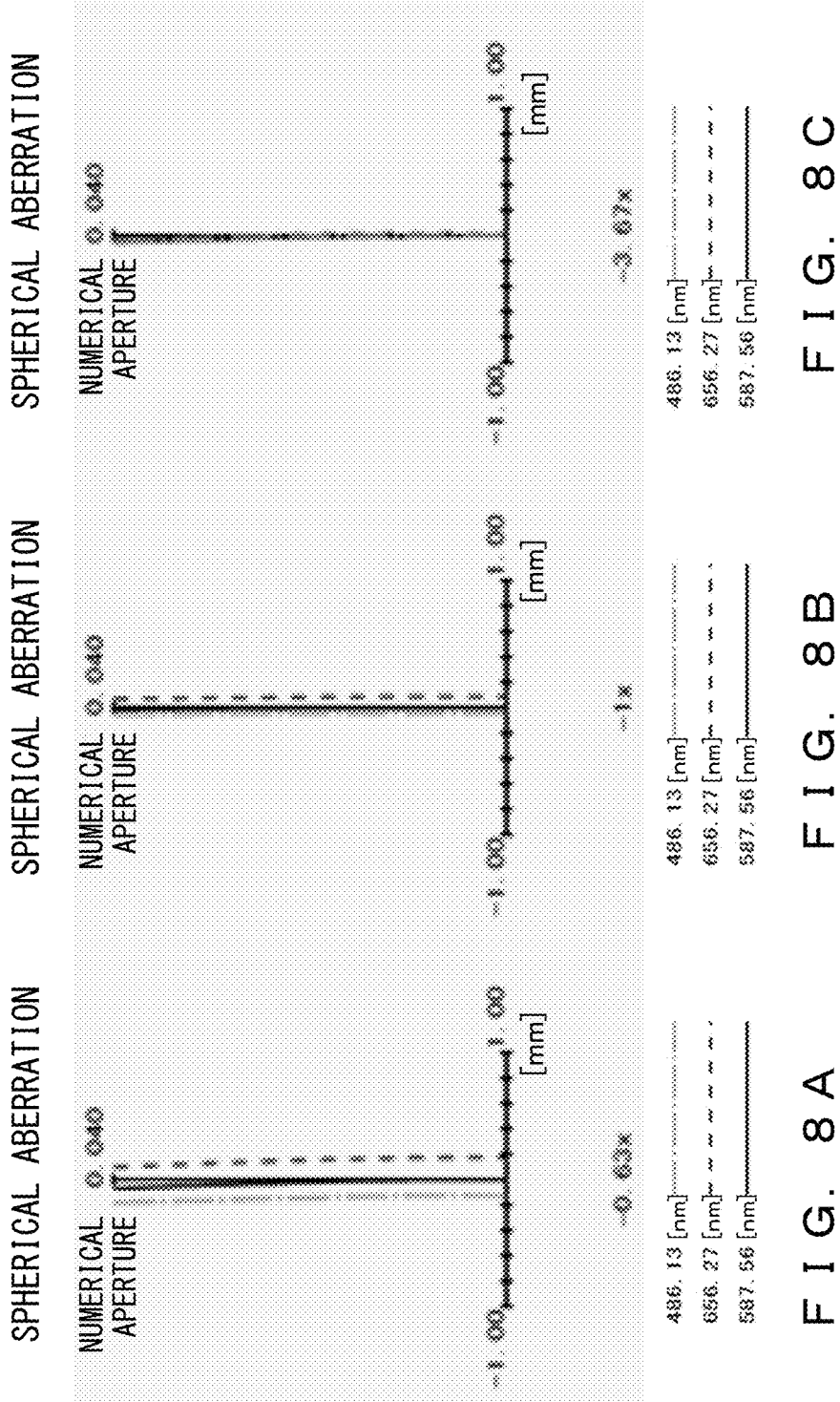

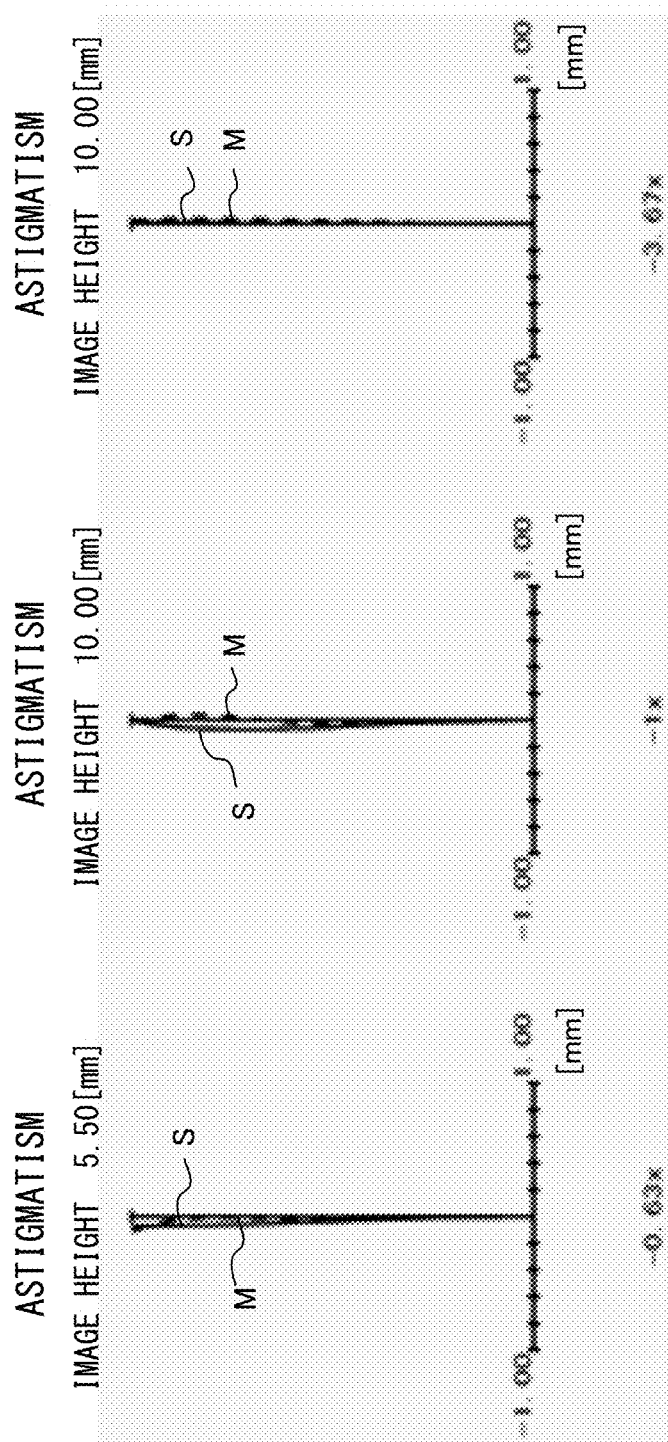

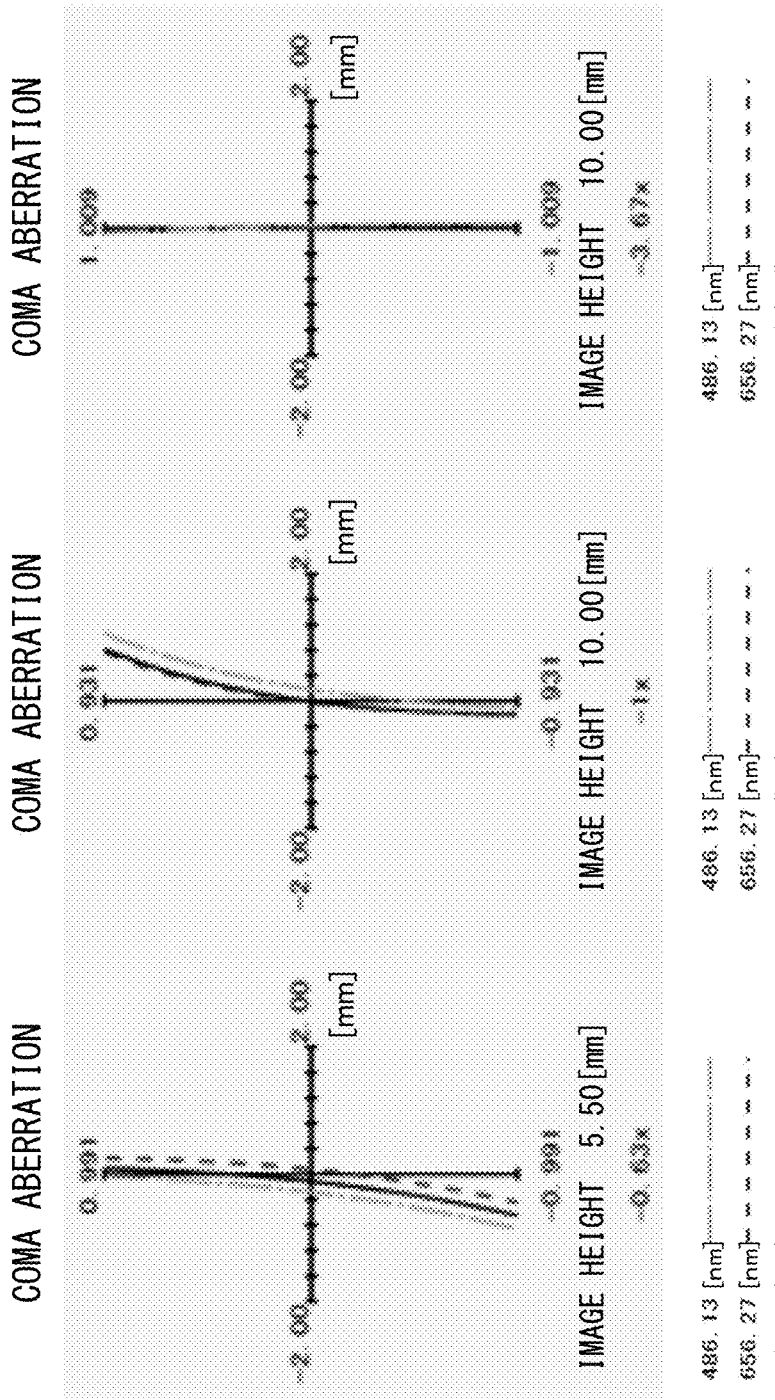

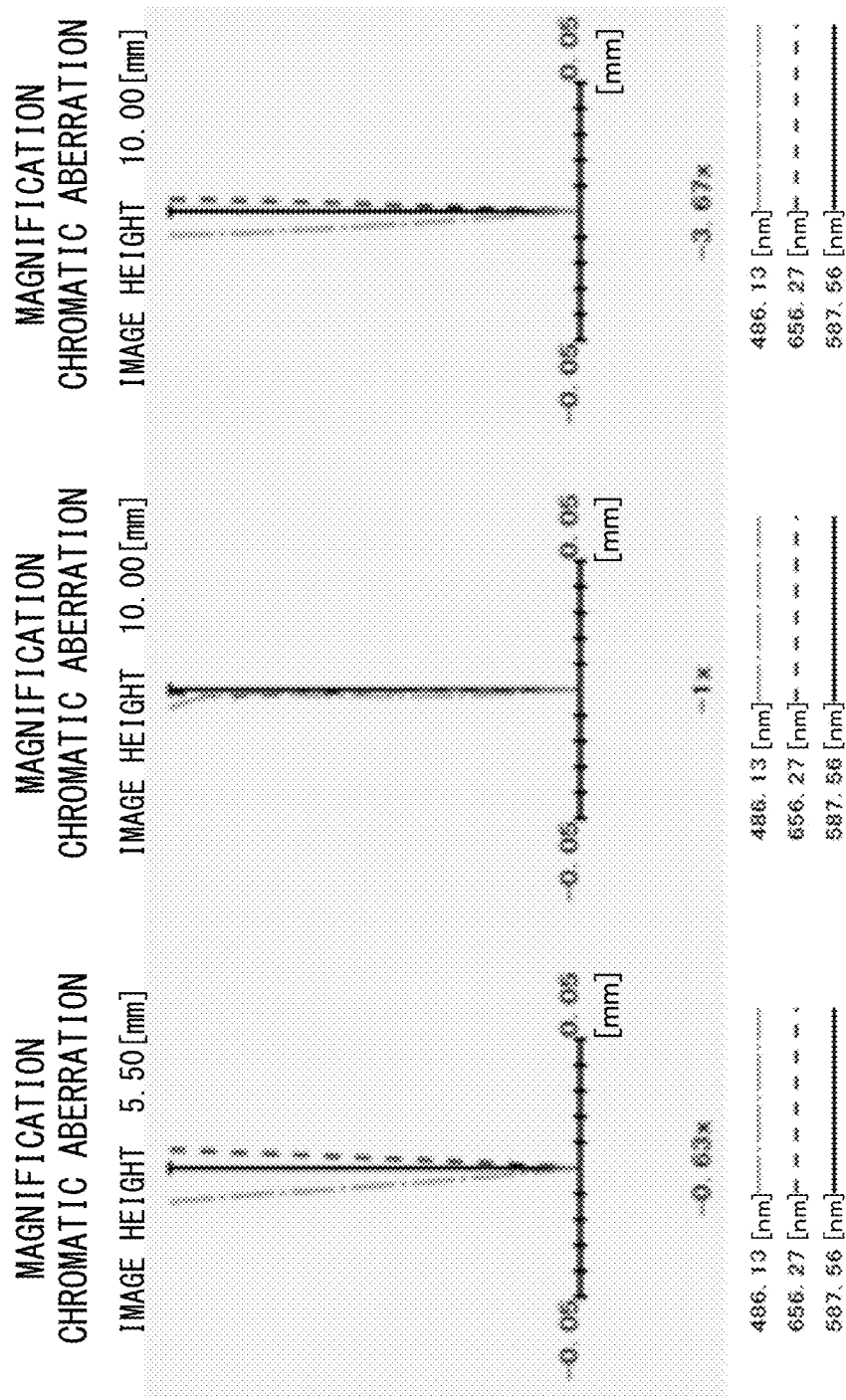

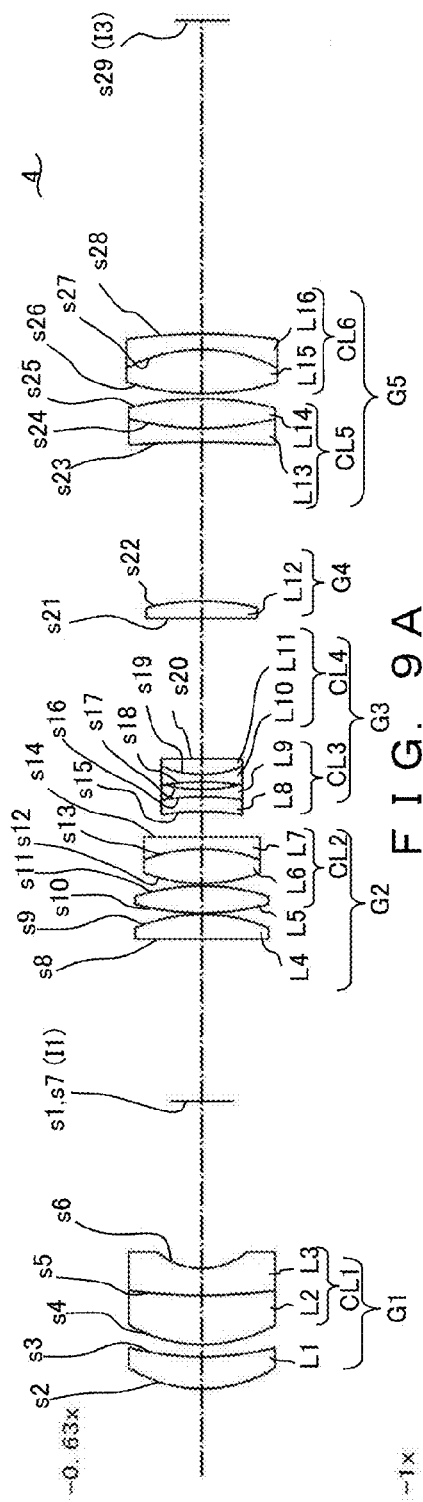
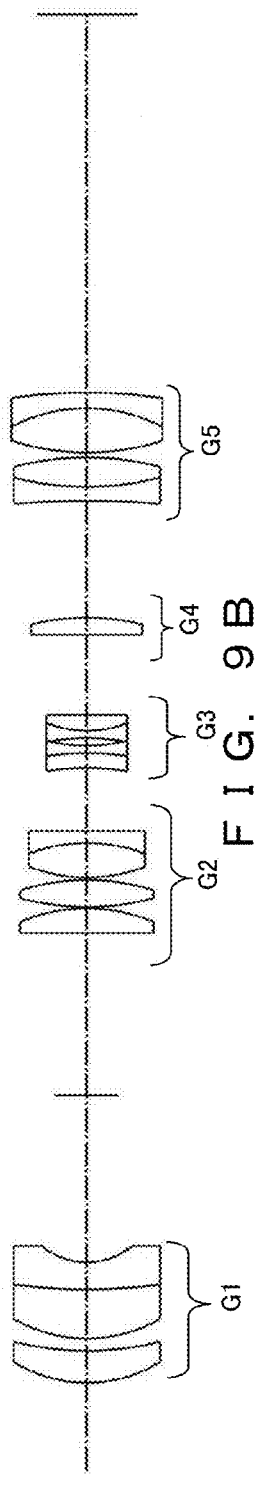
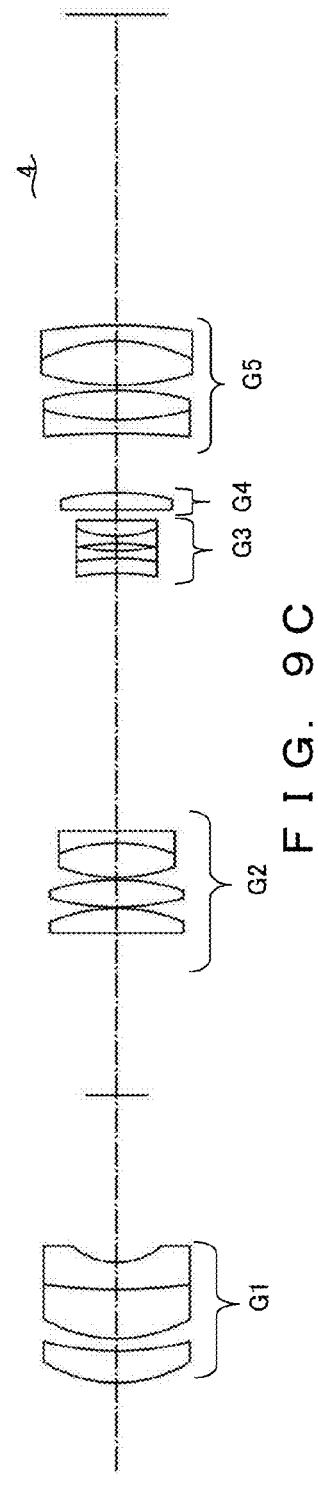
FIG. 9A
FIG. 9B
FIG. 9C

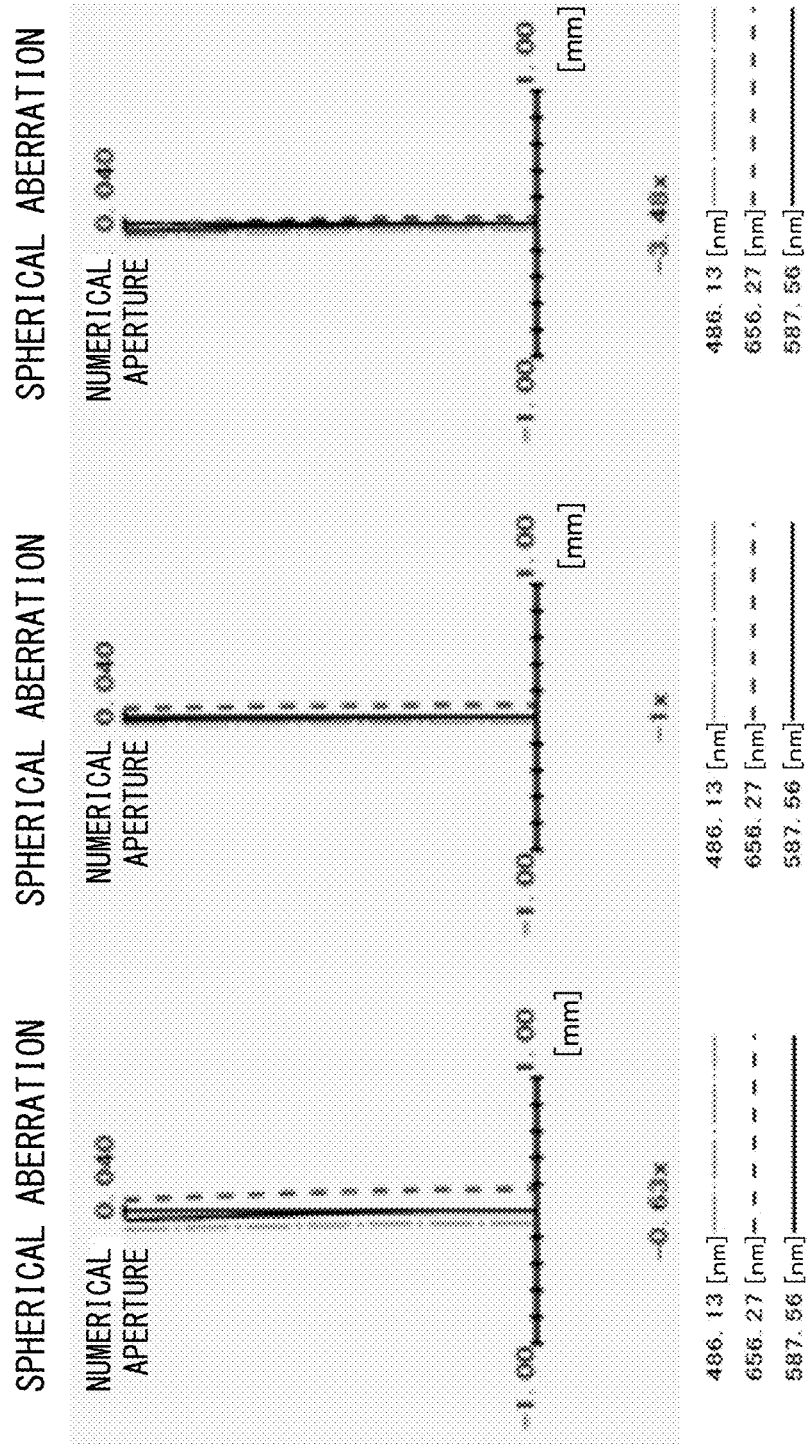

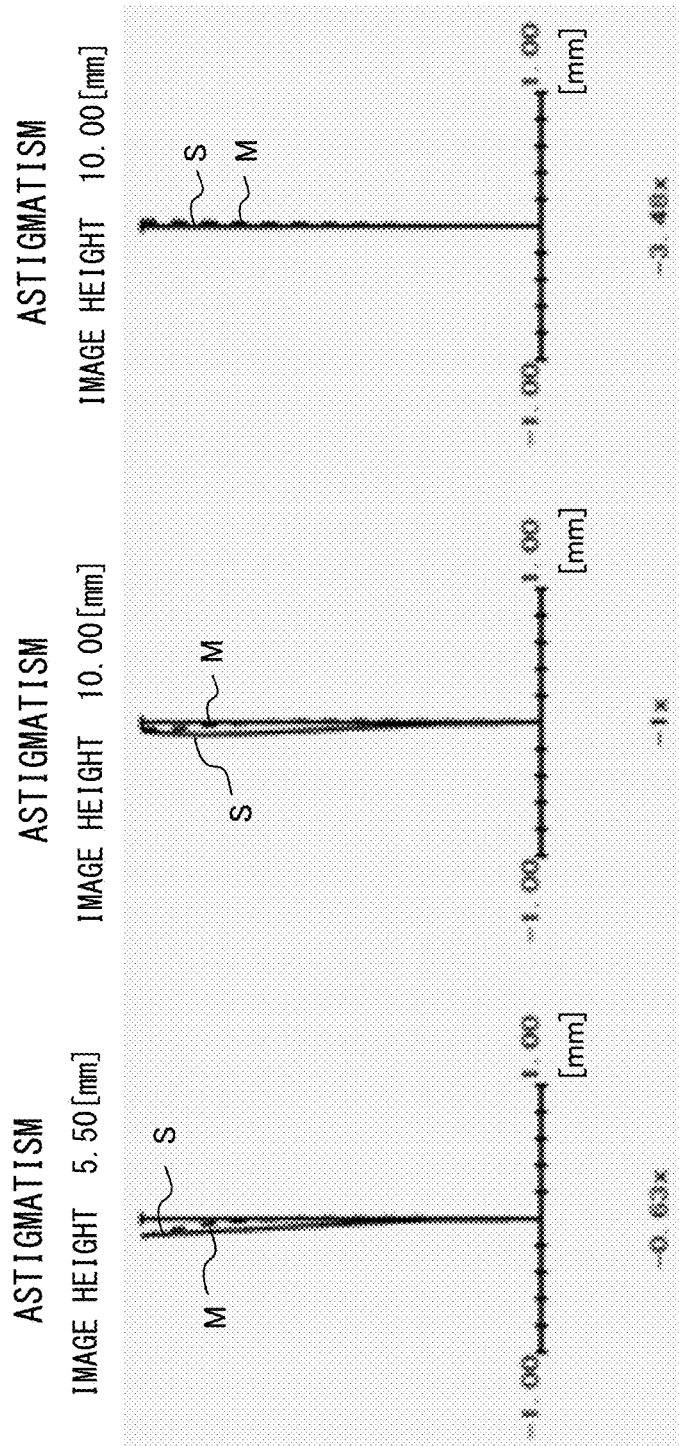

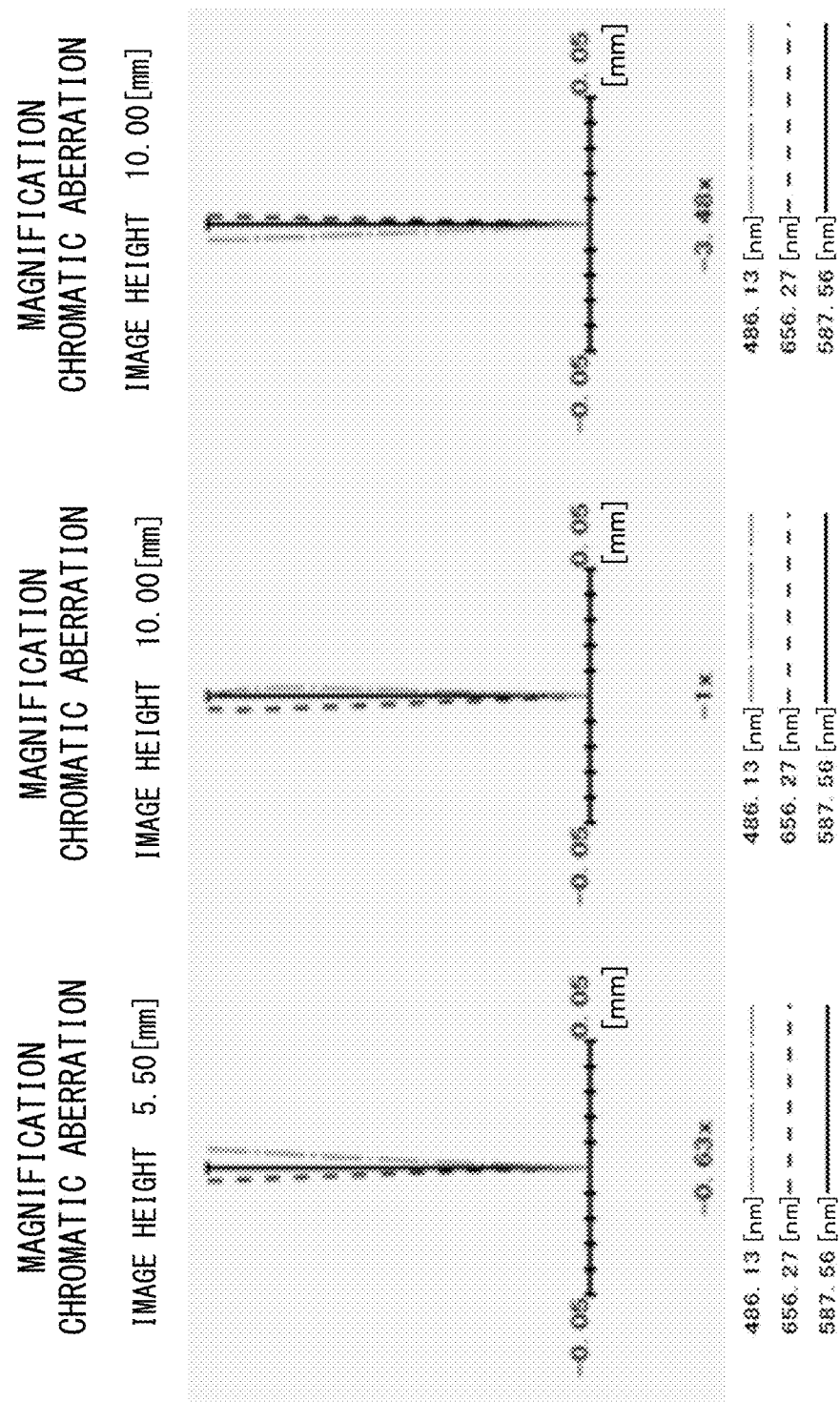

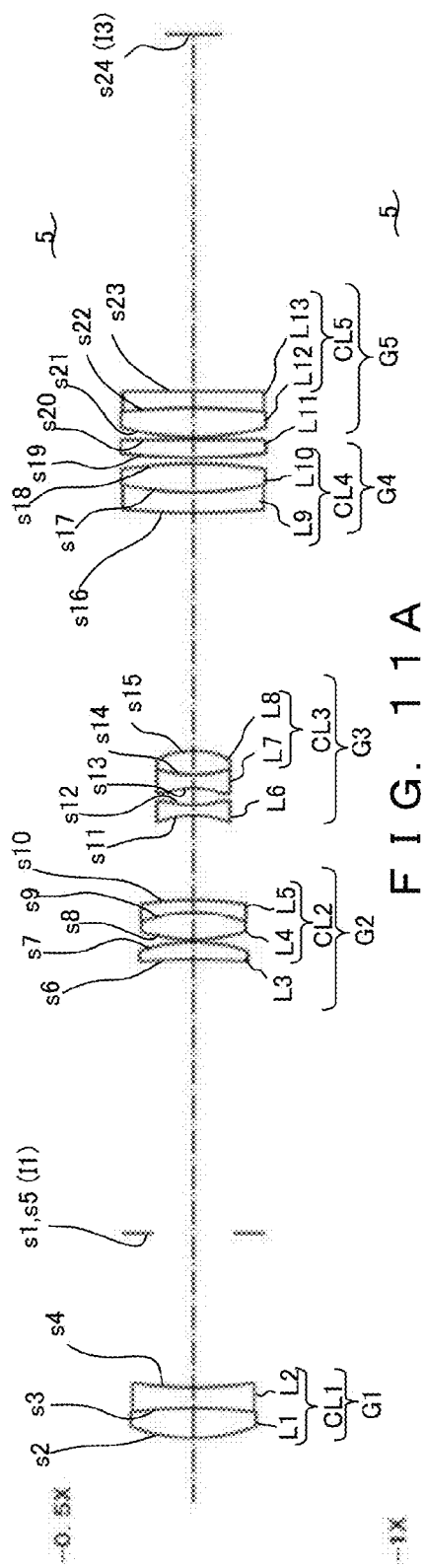
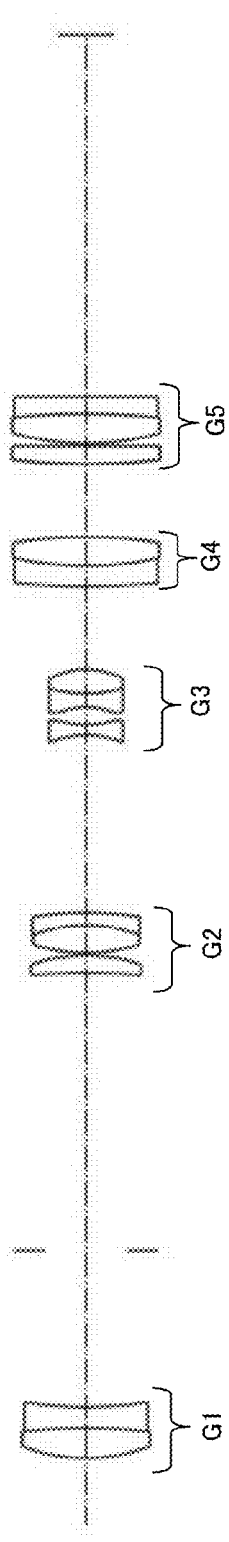
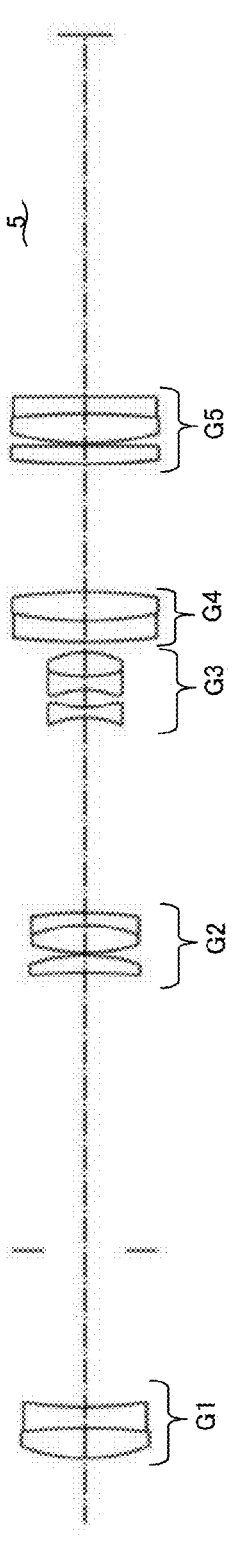
FIG. 11A
FIG. 11B
FIG. 11C

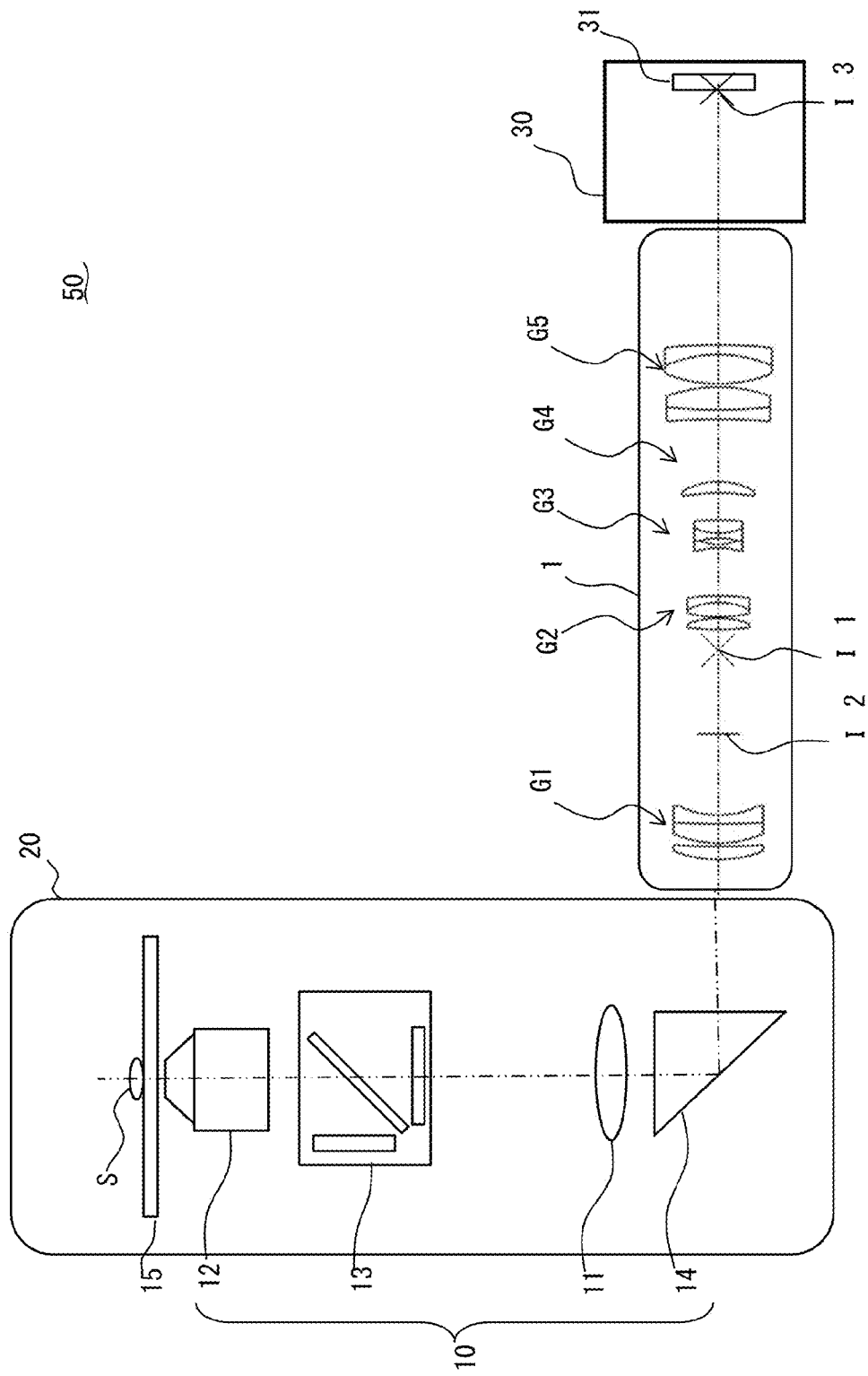
F I G. 12

IMAGING APPARATUS INCLUDING VARIABLE POWER RELAY OPTICAL SYSTEM

CROSS REFERENCE TO RELATED APPLICATIONS

This application is based upon and claims the benefit of priority from prior Japanese Patent Application No. 2014-126855, filed Jun. 20, 2014, the entire contents of which are incorporated herein by this reference.

BACKGROUND OF THE INVENTION

Field of the Invention

The present invention relates to a variable power relay optical system and an imaging apparatus that includes the variable power relay optical system.

Description of the Related Art

A variable power relay optical system is known that is arranged between an imaging optical system (hereinafter referred to as a master optical system) of an imaging apparatus such as a microscope apparatus and an imaging element, and that continuously changes magnification of an optical image projected to the imaging element. Such a variable power relay optical system is described, for example, in Japanese Laid-open Patent Publication No. 2011-150299.

SUMMARY OF THE INVENTION

One aspect of the present invention provides a variable power relay optical system arranged closer to an image side than an imaging optical system, the variable power relay optical system including, in order from a side of the imaging optical system, a front group that is arranged between the imaging optical system and a position of an image of a sample that is formed by the imaging optical system, the front group forming an intermediate image formed by reducing the image, and a rear group that forms a relay image formed by magnifying the intermediate image, the rear group including a plurality of lens groups that each move along an optical axis so as to change magnification of the rear group without changing a distance from the front group to the relay image.

Another aspect of the present invention provides an imaging apparatus including the variable power relay optical system according to the aspect above, the imaging optical system, and an imaging element that images the relay image.

BRIEF DESCRIPTION OF THE DRAWINGS

FIG. 2A and FIG. 2B are diagrams explaining the influence of a difference in magnification of a first lens group, and FIG. 2A is a ray diagram in a case in which the magnification of the first lens group is low, and FIG. 2B is a ray diagram in a case in which the magnification of the first lens group is high.

FIG. 3A, FIG. 3B, and FIG. 3C illustrate the arrangement of lenses in a low magnification end state, in a state of −1×, and in a high magnification end state, respectively.

FIG. 4A to FIG. 4L illustrate aberration of the variable power relay optical system according to Example 1 of the present invention.

FIG. 5A, FIG. 5B, and FIG. 5C illustrate the arrangement of lenses in a low magnification end state, in a state of −1×, and in a high magnification end state, respectively.

FIG. 6A to FIG. 6L illustrate aberration of the variable power relay optical system according to Example 2 of the present invention.

FIG. 7A to FIG. 7C are sectional views of a variable power relay optical system according to Example 3 of the present invention, and FIG. 7A, FIG. 7B, and FIG. 7C illustrate the arrangement of lenses in a low magnification end state, in a state of −1×, and in a high magnification end state, respectively.

FIG. 8A to FIG. 8L illustrate aberration of the variable power relay optical system according to Example 3 of the present invention.

FIG. 9A to FIG. 9C are sectional views of a variable power relay optical system according to Example 4 of the present invention, and FIG. 9A, FIG. 9B, and FIG. 9C illustrate the arrangement of lenses in a low magnification end state, in a state of −1×, and in a high magnification end state, respectively.

FIG. 10A to FIG. 10L illustrate aberration of the variable power relay optical system according to Example 4 of the present invention.

FIG. 11A to FIG. 11C are sectional views of a variable power relay optical system according to Example 5 of the present invention, and FIG. 11A, FIG. 11B, and FIG. 11C illustrate the arrangement of lenses in a low magnification end state, in a state of −1×, and in a high magnification end state, respectively.

FIG. 12 illustrates a configuration of an imaging apparatus according to Example 6 of the present invention.

DESCRIPTION OF THE EMBODIMENTS

A variable power relay optical system provides a function to continuously change magnification to a microscope apparatus, but extends an optical path length between a sample and an imaging element. As an example, in a variable power optical system disclosed in Japanese Laid-open Patent Publication No. 2011-150299, a distance between a primary image formed by a tube lens and a relay image formed by the variable power optical system is about 400 mm. Therefore, when the variable power optical system disclosed in Japanese Laid-open Patent Publication No. 2011-150299 is added to a microscope apparatus, an optical path length is extended by about 400 mm.

A ratio of a length of 400 mm to the size of the microscope apparatus is never small. Therefore, when employing a conventional variable power relay optical system in a microscope apparatus, a restriction on installation is likely to arise, and various kinds of efforts are needed to install the conventional variable power relay optical system.

Figure 1:
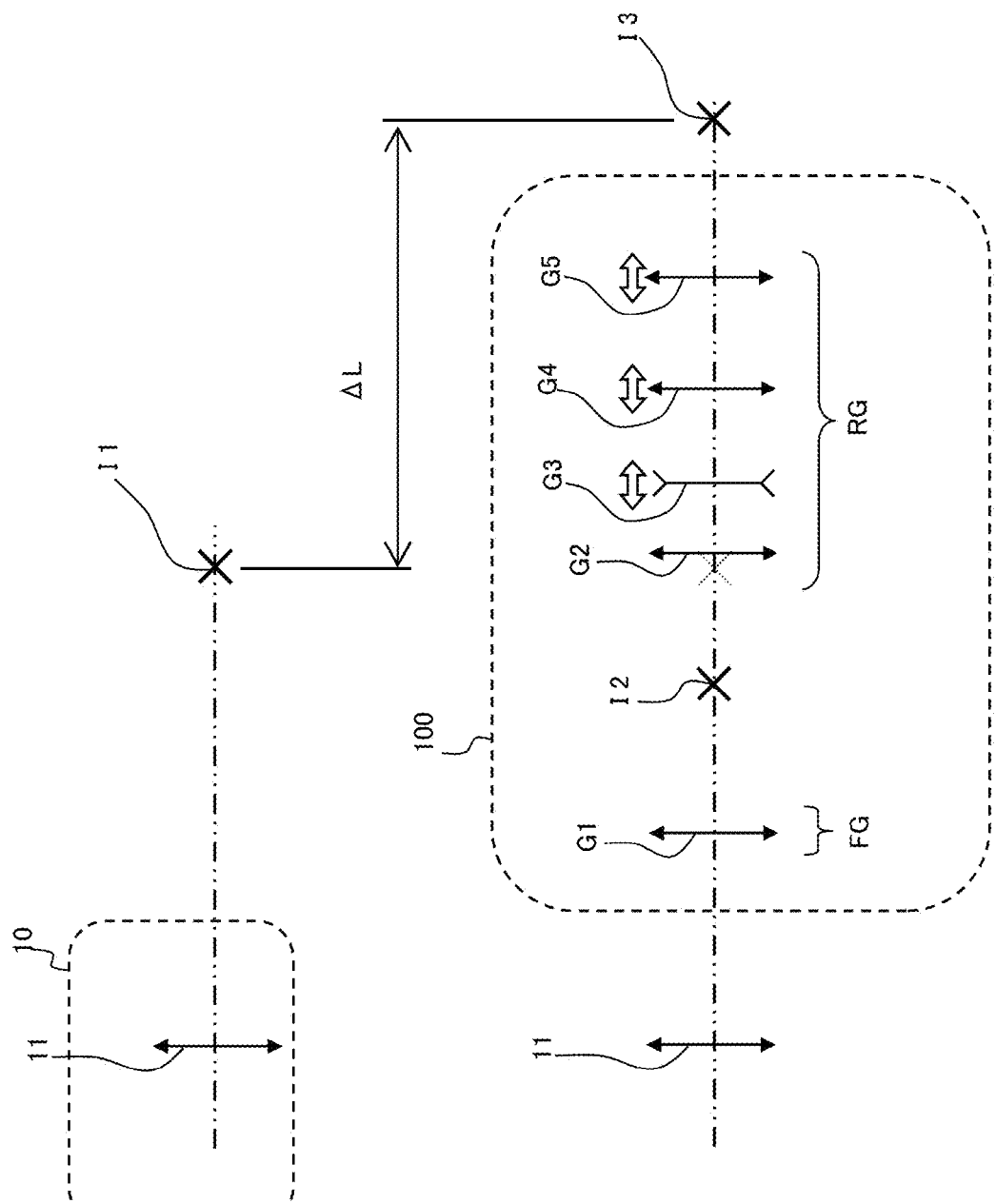
FIG. 1 is a diagram explaining a configuration of a variable power relay optical system according to an embodiment of the present invention, and an optical path length extended by the variable power relay optical system.

With reference to FIG. 1, a configuration that is common to variable power relay optical systems according to respective examples of the present invention is described below.

A variable power relay optical system 100 is a so-called zoom variable power optical system that is arranged closer to an image side than an imaging optical system (a master optical system 10) of a microscope apparatus, and that continuously changes magnification of an optical image projected to an imaging element of the microscope apparatus. The variable power relay optical system 100 is configured of a front group FG that forms an intermediate image I2 formed by reducing an image I1 of a sample to be formed by the master optical system 10, and a rear group RG that forms a relay image I3 formed by magnifying the intermediate image I2 in order from a side of the master optical system 10 (a tube lens 11).

The front group FG is arranged between the master optical system 10 and a position of the image I1. Further, because the front group FG is configured so as to form the intermediate image I2 formed by reducing the image I1, the intermediate image I2 is formed on an object side from a position in which the image I1 is formed. This allows the variable power relay optical system 100 to suppress the extension of an optical path length, compared with a conventional variable power relay optical system that is arranged behind the image I1 so as to relay the image I1. In FIG. 1, an optical path length extended by the variable power relay optical system 100 is expressed by ΔL.

The rear group RG is configured of a plurality of lens groups that provide a zoom variable power function. The rear group RG includes a plurality of lens groups that each move along an optical axis so as to change a magnification of the rear group RG (and thus a magnification of the variable power relay optical system 100) without changing a distance from the front group FG to the relay image I3.

With reference to FIG. 1 to FIG. 3, a configuration of a variable power relay optical system that is particularly desirable when suppressing the extension of an optical path length while securing a wide magnification range is described next. Here, the magnification range of the variable power relay optical system is a range of a magnification of the relay image I3 based on the image I1 (an image height of a relay image I3/an image height of an image I1), which can be changed by the variable power relay optical system. A high or low magnification is determined in accordance with the magnitude (an absolute value) of magnification.

The front group FG is constituted of a first lens group G1 having positive power, as illustrated in FIG. 1, in order to shorten an optical path length by forming the intermediate image I2 on an object side from the image I1, and it is preferable that a magnification βL1 of the first lens group G1 be smaller than 1×. The magnification βL1 of the first lens group G1 is defined by "an image height of an intermediate image I2/an image height of an image I1".

In order to suppress the generation of various aberrations relating to imaging performance, it is preferable that the most off-axis principal ray that is emitted from the first lens group G1 be emitted in a direction almost in parallel to the optical axis or a slightly diverging direction with respect to the optical axis (a direction apart from the optical axis). Therefore, it is preferable that the first lens group G1 include a meniscus lens with a convex surface facing a side of the master optical system 10, which is expected to have an effect to suppress convergence of the most off-axis principal ray.

Further, in order to shorten an optical path length while suppressing the generation of various aberrations, it is preferable that the first lens group G1 satisfy the expression below in addition to the conditions above.

$$0.7 \leq \beta L1 \leq 0.9 \tag{1}$$

When the magnification βL1 of the first lens group G1 is below a lower limit of conditional expression (1), the most off-axis principal ray is emitted from the first lens group G1 in a convergence direction, and is incident on a second lens group G2 at a low ray height. Therefore, it is difficult to satisfactorily correct aberration. As described later in detail, when the most off-axis principal ray is emitted from the second lens group G2 at a great angle, the variable power relay optical system can obtain a wide magnification range. When the most off-axis principal ray is incident on the second lens group G2 at a low ray height, it is difficult to emit the most off-axis principal ray from the second lens group G2 at a great angle, and therefore it is difficult to obtain a wide magnification range, in particular, a high magnification.

When the magnification βL1 exceeds an upper limit of conditional expression (1), the most off-axis principal ray is emitted from the first lens group G1 in a divergence direction, and the height of a ray being incident on the second lens group G2 becomes too great. This leads to an increase in a diameter and thickness of lenses that configure the second lens group G2 (and a third lens group G3). Many lenses are needed to greatly refract a divergent ray, and the number of lenses increases. Further, because the intermediate image I2 is close to the image I1, an effect to shorten an optical path length is also reduced.

FIG. 2A and FIG. 2B are diagrams explaining the influence of a difference in magnification of the first lens group G1. FIG. 2A illustrates an example in which a most off-axis principal ray PR2 is emitted from the first lens group G1 in a direction almost in parallel to the optical axis (a principal ray PR1 on the axis). A magnification of the first lens group G1 illustrated in FIG. 2A is 0.71, and is near a lower limit of expression (1). FIG. 2B illustrates an example in which the most off-axis principal ray PR2 is emitted from the first lens group G1 in a slightly divergent direction with respect to the optical axis (the principal ray PR1 on the axis). A magnification of the first lens group G1 illustrated in FIG. 2B is 0.88, and is near an upper limit of expression (1). FIG. 2A and FIG. 2B respectively illustrate a portion of a variable power relay optical system 1 according to Example 1 described later, and a portion of a variable power relay optical system 3 according to Example 3 described later.

Comparing FIG. 2A with FIG. 2B, as the magnification of the first lens group G1 decreases, the intermediate image I2 is formed closer to the master optical system 10 and the optical path length is shortened, and a tendency that a direction of the most off-axis principal ray PR2 is changed to a convergent direction can be confirmed.

It is preferable that, as illustrated in FIG. 1, the rear group RG be configured of a second lens group G2 with positive power that is arranged at a prescribed distance from the front group FG, a third lens group G3 with negative power, which is a moving group movable along the optical axis, a fourth lens group G4 with positive power, which is a moving group movable along the optical axis, and a fifth lens group G5 with positive power, which is a moving group movable along the optical axis, in order from the front group FG.

Figure 3A:
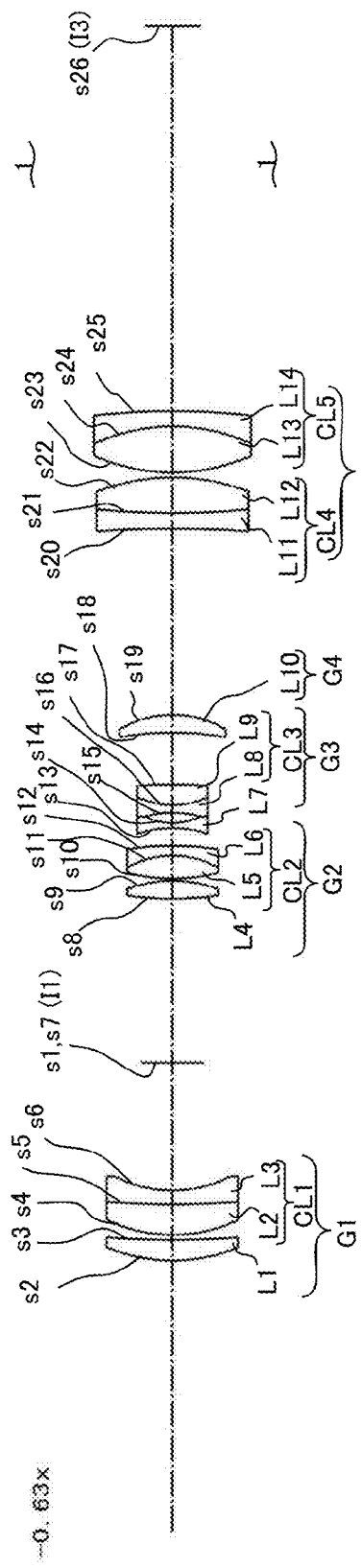
FIG. 3A to FIG. 3C are sectional views of a variable power relay optical system according to Example 1 of the present invention.
Figure 3B:
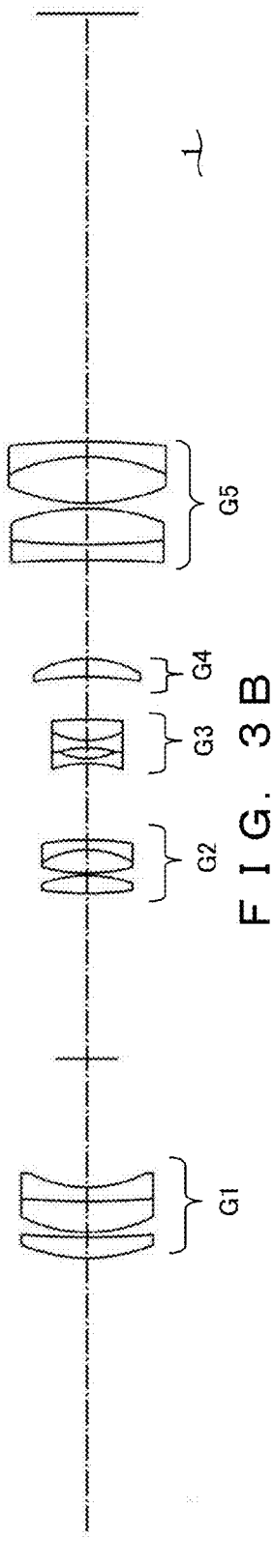
Figure 3C:
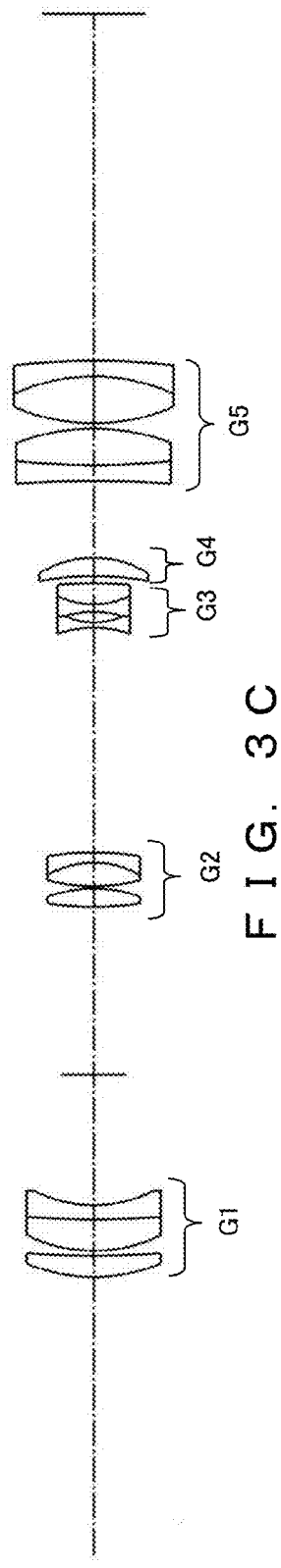

It is preferable that the moving group be configured such that a magnification range of the variable power relay optical system includes −1×, at which a relay image I3 having the same size as that of the mage I1 is formed. Further, as illustrated in FIG. 3A to FIG. 3C, it is preferable that the moving groups move as described in (A), (B), and (C) below, while the magnitude (i.e., an absolute value) of a magnification of the variable power relay optical system is changed from a low magnification end state in which the magnitude is smallest (see FIG. 3A) through a state of (see FIG. 3B) to a high magnification end state in which the magnitude is greatest (see FIG. 3C).

(A) The third lens group G3 moves from a side of the intermediate image I2 (image I1) to a side of the relay image I3 without reversal.

(B) The fourth lens group G4 moves from the side of the intermediate image I2 (image I1) to the side of the relay image I3. The fourth lens group G4 is located closer to the side of the relay image I3 in the high magnification end state than in the low magnification end state.

(C) The fifth lens group G5 moves to the side of the relay image I3 after moving to the side of the intermediate image I2 (namely, the side of the image I1).

It is preferable that the second lens group G2 have a strong positive power in order to shorten an optical path length. When the second lens power G2 has a strong positive power, an angle of an off-axis principal ray emitted from the second lens group G2 increases. Therefore, a range of an off-axis principal ray that is incident on the third lens group G3 is changed by a slight movement of the third lens group G3, and the most off-axis principal ray that configures the relay image I3 is also changed. As a result, a movement distance of the third lens group G3 that is needed to realize a prescribed magnification range decreases, and therefore the optical path length of the variable power relay optical system can also decrease.

The second lens group G2 has a function to relay the intermediate image I2 that is formed by the first lens group G1. In order to relay the intermediate image I2 while suppressing the generation of various aberrations relating to imaging performance, it is preferable that the second lens group G2 have a positive lens closest to the side of the master optical system 10. It is also preferable that the positive lens have a convex surface that has a stronger refractive power than a surface on the side of the master optical system 10 face the side of the relay image I3. Because an image is inverted as a result of relaying, a magnification $\beta L2$ of the second lens group G2 has a negative value.

Further, it is preferable that the second lens group G2 satisfy the expression below together with the first lens group G1 in order to obtain a high variable power ratio (a ratio of a maximum magnification to a minimum magnification of the variable power relay optical system 1) while suppressing the extension of the optical path length. $\beta L1-2$ expresses a comprehensive magnification of the first lens group G1 and the second lens group G2 that is defined by "an image height of a relay image formed by the first lens group G1 and the second lens group G2/an image height of an image I1", and has a negative value. $|\beta L1-2|$ expresses the magnitude of the comprehensive magnification of the first lens group G1 and the second lens group G2. The magnification $\beta L2$ of the second lens group G2 is calculated by $\beta L1-2/\beta L1$.

$$1.4 \leq |\beta L1-2| \leq 2.2 \quad (2)$$

In order to widen a magnification range of the variable power relay optical system in a magnifying direction (namely, in order to enhance a magnification of the variable power relay optical system in the high magnification end state), it is preferable that a large relay image be formed by using the first lens group G1 and the second lens group G2. When the magnitude $|\beta L1-2|$ of the comprehensive magnification is below a lower limit of conditional expression (2), a formed relay image is too small and the magnification of the variable power relay optical system is not sufficiently enhanced, and it is difficult to obtain a great variable power ratio. When the magnitude $|\beta L1-2|$ of the comprehensive magnification exceeds an upper limit of conditional expression (2), a position at which a relay image is formed is too far away from the second lens group, and it is difficult to sufficiently suppress the extension of the optical path length.

The third lens group G3 greatly affects a variable power function of the variable power relay optical system, as described above. In order to realize a great variable power ratio while shortening a movement distance of the third lens group G3, it is preferable that the third lens group G3 have a strong negative power. In order to suppress the generation of various aberrations while having a strong negative power, it is preferable that the third lens group G3 include two lenses having concave surfaces facing each other.

It is preferable that the fourth lens group G4 be a positive lens having a convex surface on the side of the relay image I3. The positive lens may be a single lens or a cemented lens. The positive lens may be a biconvex lens or a meniscus lens. When the positive lens is a biconvex lens, it is preferable that the positive lens have a convex surface with a stronger refractive power on the side of the relay image I3.

It is preferable that the fifth lens group G5 be configured so as to form the relay image I3 at a position at which back focuses that are required by various camera mounts are secured regardless of the magnification of the variable power relay optical system and at a position that is as close as possible to the master optical system 10. It is preferable that a lens that is closest to the side of the relay image I3 in the fifth lens group G5 be a positive lens having a convex surface on the side of the master optical system 10.

When a request for the suppression of the extension of an optical path length or a request for a high variable power ratio is relatively less strict, the third lens group and the lens group that follows of the variable power relay optical system may be configured by a lens group with negative power that is a moving group, and a lens group with positive power that is a moving group in order from the side of the front group FG. The third lens group and the lens groups that follow may be configured by a lens group with negative power that is a moving group, a lens group with positive power that is a moving group, and a fixed lens group with positive power in order from the side of the front group FG.

According to a variable power relay optical system according to each of the examples of the present invention, an optical path length $\Delta L$ extended by the variable power relay optical system is about 190 mm, and the extension of the optical path length can be greatly suppressed, compared with the conventional variable power relay optical system. Accordingly, a restriction on installation is unlikely to arise. A distance from the intermediate image I2 to the relay image I3 is about 220 mm, and the distance can be reduced to about ½ of the distance of a conventional variable power relay optical system by which almost the same variable power ratio is realized (for example, in Example 2 in Japanese Laid-open Patent Publication No. 2011-150299, 431 mm).

A limit of a resolution of a general optical microscope is about 0.2 μm when using a high-NA 100-power oil-immersed objective lens (e.g., NA1.40), and is about 20 μm on an image plane. This corresponds to about 3 pixels when performing imaging by using, for example, an imaging element having a pixel pitch of about 6.5 μm, and therefore it is possible to barely grasp a limit of a resolution of an optical system (namely, that two points have been resolved). However, image resolution (namely, the number of pixels with respect to a size of an object to be captured) is insufficient to grasp a limit of a two-point resolution on an observed image. In the condition above, in order to have an observed image obtain a sufficient resolution, it is preferable that an object be further magnified with high power about 3 times or more so as to have a size of about 10 pixels.

By adding the variable power relay optical system according to each of the examples of the present invention to an imaging apparatus, continuous variable magnification can be performed from a magnification at which the image I1 formed by the master optical system 10 is reduced to a magnification at which the image I1 is magnified with high power. Accordingly, the variable power relay optical system according to each of the examples of the present invention can be employed for a "location finding" purpose for observing a sample at a reduction magnification so as to find a specified portion in the sample, a purpose of grasping a limit of a resolution of the master optical system 10, and a purpose of magnifying an image with high power up to a magnification that exceeds the limit.

Respective examples are specifically described below. Description of the configuration above that is common to the variable power relay optical systems according to the respective examples is omitted.

Example 1

FIG. 3A to FIG. 3C are sectional views of the variable power relay optical system 1 according to this example. FIG. 3A, FIG. 3B, and FIG. 3C illustrate the arrangement of lenses in a low magnification end state, in a state of −1×, and in a high magnification end state, respectively.

The front group FG is configured of a first lens group G1 that includes a meniscus lens (lens L1) with positive power that has a convex surface facing an object side, and a cemented lens CL1 in order from the object side (a side of the master optical system 10 not illustrated). The cemented lens CL1 is configured of a meniscus lens (lens L2) with positive power that has a convex surface facing the object side, and a meniscus lens (lens L3) with negative power that has a convex surface facing the object side.

The rear group RG is configured of a second lens group G2 with positive power, a third lens group G3 with negative power, which is a moving group movable along an optical axis, a fourth lens group G4 with positive power, which is a moving group movable along the optical axis, and a fifth lens group G5 with positive power, which is movable along the optical axis, in order from the object side.

The second lens group G2 is configured of a biconvex lens (lens L4), and a cemented lens CL2 that is configured of a biconvex lens (lens L5) and a meniscus lens (lens L6) having a concave surface facing the object side, in order from the object side. The second lens group G2 is a lens group that is fixed at a fixed position regardless of magnification, as illustrated in FIG. 3A to FIG. 3C.

The third lens group G3 is configured of a biconvex lens (lens L7), and a cemented lens CL3 that is configured of a biconcave lens (lens L8) and a biconvex lens (lens L9), in order from the object side. The third lens group G3 moves from the side of the image I1 (intermediate image I2) to the side of the relay image I3 without reversal while the magnification is changed from the low magnification end state to the high magnification end state, as illustrated in FIG. 3A to FIG. 3C.

The fourth lens group G4 is configured of a meniscus lens (lens L10) with positive power that has a concave surface facing the object side. The fourth lens group G4 moves from the side of the image I1 (intermediate image I2) to the side of the relay image I3 while the magnification is changed from the low magnification end state to the high magnification end state, and is located closer to the relay image I3 in the high magnification end state than in the low magnification end state, as illustrated in FIG. 3A to FIG. 3C.

The fifth lens group G5 is configured of a cemented lens CL4 that is configured of a biconcave lens (lens L11) and a biconvex lens (lens L12), and a cemented lens CL5 that is configured of a biconvex lens (lens L13) and a meniscus lens (lens L14) having a concave surface facing the object side, in order from the object side. The fifth lens group G5 moves to the side of the image I1 (intermediate I2), and then moves to the side of the relay image I3, as illustrated in FIG. 3A to FIG. 3C.

Various kinds of data of the variable power relay optical system 1 are described below.

A magnification $\beta L1$ of the first lens group, a comprehensive magnification $\beta L1$-2 of the first lens group and the second lens group, a maximum magnification $\beta MAX$, a minimum magnification $\beta MIN$ of the variable power relay optical system 1, and an extended optical path length $\Delta L$ are respectively expressed below. The variable power relay optical system 1 satisfies expressions (1) and (2).

$$\beta L1 = 0.71, \beta L1\text{-}2 = -1.44,$$

$$\beta MAX = -3, \beta MIN = -0.63,$$

$$\Delta L = 186.428 \text{ mm}$$

Lens data of the variable power relay optical system 1 is described below.

| Variable power relay optical system 1 | | | | |
|---|---|---|---|---|
| s | r | d | nd | vd |
| 0 | INF | 0.0 | 1.0 | |
| 1 | INF | −55.239 | 1.0 | |
| 2 | 34.160 | 4 | 1.48749 | 70.23 |
| 3 | 155.399 | 1 | 1.0 | |
| 4 | 29.929 | 6 | 1.49700 | 81.54 |
| 5 | 179.693 | 2.7 | 1.77250 | 49.60 |
| 6 | 25.036 | 25.0 | 1.0 | |
| 7 | INF | 32.131 | 1.0 | |
| 8 | 63.954 | 3.5 | 1.59522 | 67.74 |
| 9 | −25.864 | 0.4 | 1.0 | |
| 10 | 34.500 | 4.5 | 1.49700 | 81.54 |
| 11 | −18.473 | 2 | 1.80000 | 29.84 |
| 12 | −56.514 | D1 | 1.0 | |
| 13 | −22.204 | 1 | 1.74951 | 35.33 |
| 14 | 12.838 | 2.027 | 1.0 | |
| 15 | −19.569 | 1.5 | 1.43875 | 94.93 |
| 16 | 16.442 | 4 | 1.80000 | 29.84 |
| 17 | −92.068 | D2 | 1.0 | |
| 18 | −59.914 | 3.5 | 1.59522 | 67.74 |
| 19 | −20.465 | D3 | 1.0 | |
| 20 | −227.079 | 3 | 1.80810 | 22.76 |
| 21 | 146.561 | 7 | 1.49700 | 81.54 |
| 22 | −42.085 | 1 | 1.0 | |
| 23 | 39.276 | 9 | 1.49700 | 81.54 |
| 24 | −36.813 | 3 | 1.75500 | 52.32 |
| 25 | −138.615 | D4 | 1.0 | |
| 26 | INF | 0 | 1.0 | |

Here, s expresses a surface number, r expresses a radius of curvature (mm), d expresses a surface spacing (mm), nd expresses a refractive index to the d line, and vd expresses an Abbe number. Surface numbers s1 and s7 express image plane of the image I1 that the master optical system 10 forms, and surface number s26 expresses an image plane of the relay image I3 that the variable power relay optical system 1 forms. Surface spacings d12, d17, d19, and d25 are variable values D1, D2, D3, and D4, which vary in accordance with the variable power operation of the variable power relay optical system 1.

The variable values D1, D2, D3, and D4 in the low magnification end state illustrated in FIG. 3A, in the state of −1× illustrated in FIG. 3B, and in the high magnification end state illustrated in FIG. 3C are described below.

|    | Magnification | | |
|----|--------|--------|--------|
|    | −0.63X | −1X    | −3X    |
| D1 | 3.415  | 14.801 | 42.985 |
| D2 | 10.173 | 8.351  | 1.337  |
| D3 | 36.440 | 19.189 | 14.739 |
| D4 | 75.381 | 83.068 | 66.348 |

FIG. 4A to FIG. 4L illustrate aberration of the variable power relay optical system 1. FIG. 4A to FIG. 4C respectively illustrate spherical aberration in the low magnification end state, in the state of −1×, and in the high magnification end state. FIG. 4D to FIG. 4F respectively illustrate astigmatism in the low magnification end state, in the state of −1×, and in the high magnification end state. FIG. 4G to FIG. 4I respectively illustrate coma aberration in the low magnification end state, in the state of −1×, and in the high magnification end state. FIG. 4J to FIG. 4L respectively illustrate magnification chromatic aberration in the low magnification end state, in the state of −1×, and in the high magnification end state. All of the aberration diagrams illustrate that the aberration has been satisfactorily corrected. In order to compare the extent of aberration in the same-scale regardless of magnification, the respective aberration diagrams illustrate an aberration amount in a case in which backward ray tracing is performed from the relay image I3 to the image I1 so as to set an entrance pupil position to the variable power relay optical system 1 to be at the infinity position. An image height in each of the aberration diagrams expresses an image height of the relay image I3. In the state of −1× and in the high magnification end state, the image height is limited by a size of an imaging element, and therefore the image height is the size of the imaging element. "M" in the respective diagrams expresses a meridional component, and "S" expresses a sagittal component.

Example 2

Figure 5A:
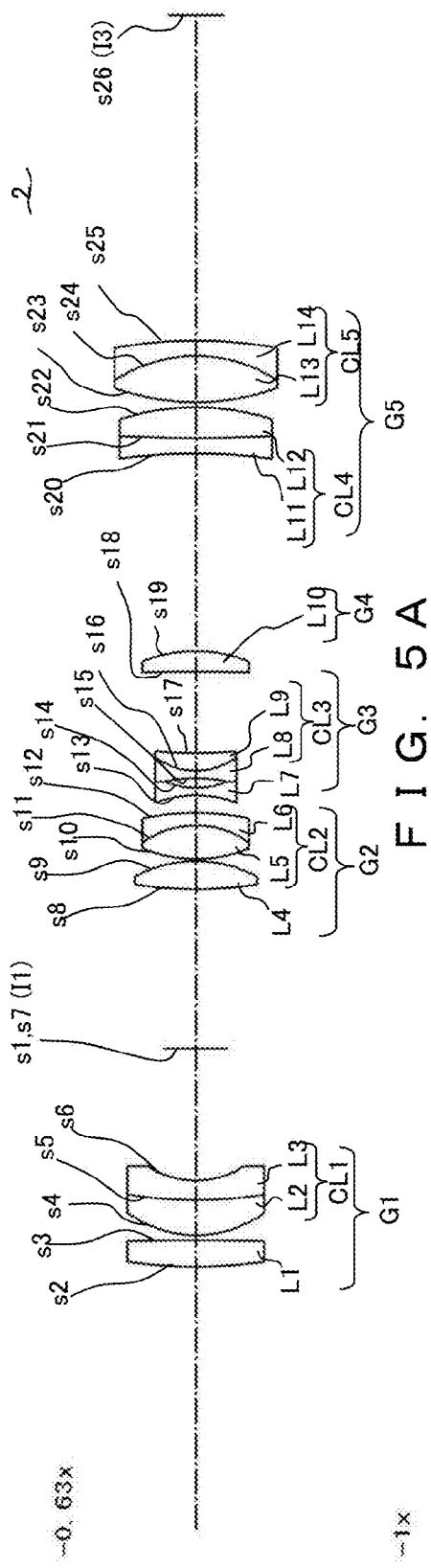
FIG. 5A to FIG. 5C are sectional views of a variable power relay optical system according to Example 2 of the present invention.
Figure 5B:
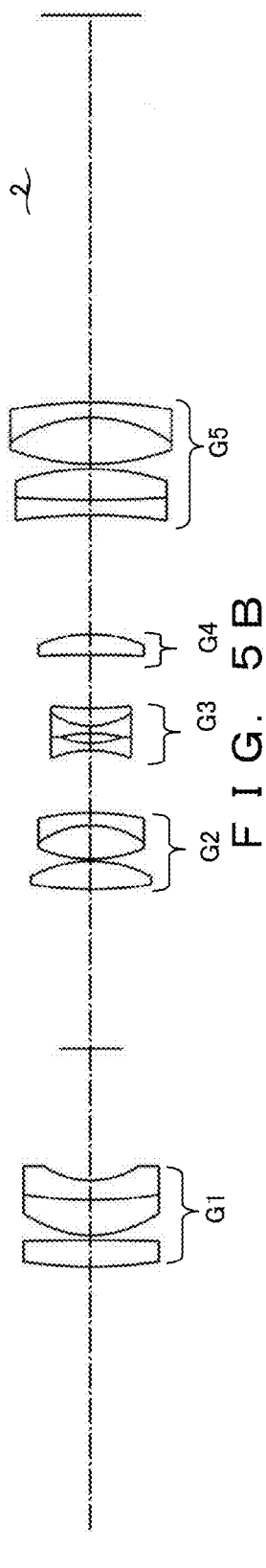
Figure 5C:
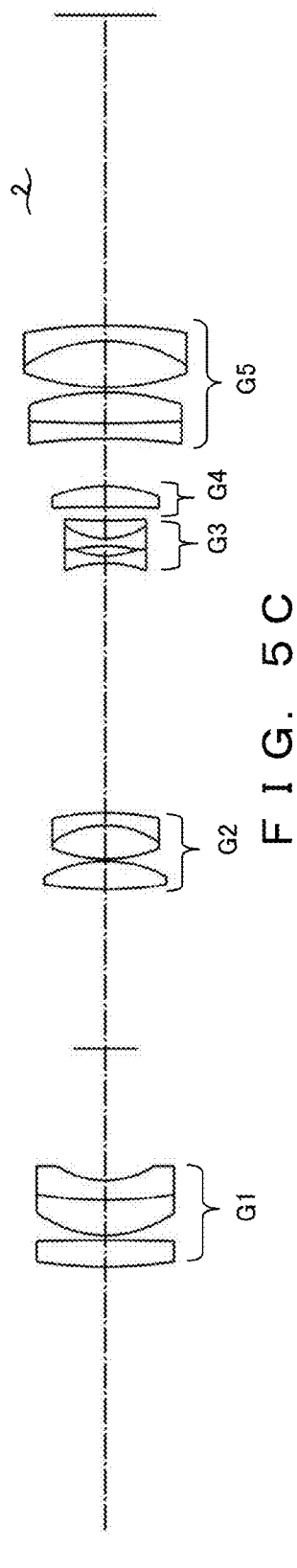

FIG. 5A to FIG. 5C are sectional views of a variable power relay optical system 2 according to this example. FIG. 5A, FIG. 5B, and FIG. 5C illustrate the arrangement of lenses in the low magnification end state, in the state of −1×, and in the high magnification end state, respectively.

A front group FG is configured of a first lens group G1 that is configured of a biconvex lens (lens L1) and a cemented lens CL1, in order from an object side. The cemented lens CL1 is configured of a meniscus lens (lens L2) with positive power that has a convex surface facing the object side, and a meniscus lens (lens L3) with negative power that has a convex surface facing the object side.

A rear group RG is configured of a second lens group G2 with positive power, a third lens group G3 with negative power, which is a moving group movable along an optical axis, a fourth lens group G4 with positive power, which is a moving group movable along the optical axis, and a fifth lens group G5 with positive power, which is movable along the optical axis, in order from the object side.

The second lens group G2 is configured of a biconvex lens (lens L4), and a cemented lens CL 2 that is configured of a biconvex lens (lens L5) and a meniscus lens (lens L6) that has a concave surface facing the object side, in order from the object side.

The third lens group G3 is configured of a biconcave lens (lens L7), and a cemented lens CL3 that is configured of a biconcave lens (lens L8) and a meniscus lens (lens L9) with positive power that has a convex surface facing the object side, in order from the object side.

The fourth lens group G4 is configured of a meniscus lens (lens L10) with positive power that has a concave surface facing the object side.

The fifth lens group G5 is configured of a cemented lens CL4 that is configured of a biconcave lens (lens L11) and a biconvex lens (lens L12), and a cemented lens CL5 that is configured of a biconvex lens (lens L13) and a meniscus lens (lens L14) that has a concave surface facing the object side, in order from the object side.

The moving groups in the variable power relay optical system 2 move similarly to the moving groups in the variable power relay optical system 1 according to Example 1.

Various kinds of data of the variable power relay optical system 2 are described below.

A magnification $\beta L1$ of the first lens group, a comprehensive magnification $\beta L1$-2 of the first lens group and the second lens group, a maximum magnification $\beta MAX$ and a minimum magnification $\beta MIN$ of the variable power relay optical system 2, and an extended optical path length $\Delta L$ are respectively expressed below. The variable power relay optical system 2 satisfies expressions (1) and (2).

$\beta L1 = 0.79, \beta L1-2 = -1.98,$ $\beta MAX = -3.5, \beta MIN = -0.63,$ $\Delta L = 188.492$ mm Lens data of the variable power relay optical system 2 is described below.

| Variable power relay optical system 2 | | | | |
|---|---|---|---|---|
| s | r | d | nd | vd |
| 0 | INF | 0.0 | 1.0 | |
| 1 | INF | −57.132 | 1.0 | |
| 2 | 91.042 | 5.2 | 1.49700 | 81.54 |
| 3 | −455.213 | 1 | 1.0 | |
| 4 | 23.036 | 6.8 | 1.59522 | 67.74 |
| 5 | 81.428 | 3.8 | 1.77250 | 49.60 |
| 6 | 17.152 | 25.8 | 1.0 | |
| 7 | INF | 30.921 | 1.0 | |
| 8 | 78.025 | 5.5 | 1.59522 | 67.74 |
| 9 | −24.876 | 0.4 | 1.0 | |
| 10 | 28.342 | 6.5 | 1.43875 | 94.93 |
| 11 | −18.521 | 2.5 | 1.80000 | 29.84 |
| 12 | −50.476 | D1 | 1.0 | |
| 13 | −23.037 | 1.4 | 1.48749 | 70.23 |
| 14 | 15.605 | 1.953 | 1.0 | |

-continued

Variable power relay optical system 2

| s | r | d | nd | vd |
|---|---|---|---|---|
| 15 | −29.071 | 1.4 | 1.51633 | 64.14 |
| 16 | 13.404 | 3.5 | 1.70154 | 41.24 |
| 17 | 98.850 | D2 | 1.0 | |
| 18 | −249.961 | 4 | 1.48749 | 70.23 |
| 19 | −27.256 | D3 | 1.0 | |
| 20 | −113.791 | 3 | 1.80810 | 22.76 |
| 21 | 294.811 | 6 | 1.59522 | 67.74 |
| 22 | −49.109 | 1 | 1.0 | |
| 23 | 48.065 | 9 | 1.59522 | 67.74 |
| 24 | −29.158 | 3 | 1.75500 | 52.32 |
| 25 | −89.031 | D4 | 1.0 | |
| 26 | INF | 0 | 1.0 | |

Variable values D1, D2, D3, and D4 in the low magnification end state illustrated in FIG. 5A, in the state of −1× illustrated in FIG. 5B, and in the high magnification end state illustrated in FIG. 5C are described below.

Magnification

| | −0.63X | −1X | −3.5X |
|---|---|---|---|
| D1 | 3.403 | 12.115 | 48.585 |
| D2 | 15.855 | 10.392 | 2.760 |
| D3 | 38.414 | 23.143 | 9.241 |
| D4 | 63.278 | 75.300 | 60.363 |

Figures 6G, 6H, 6I:
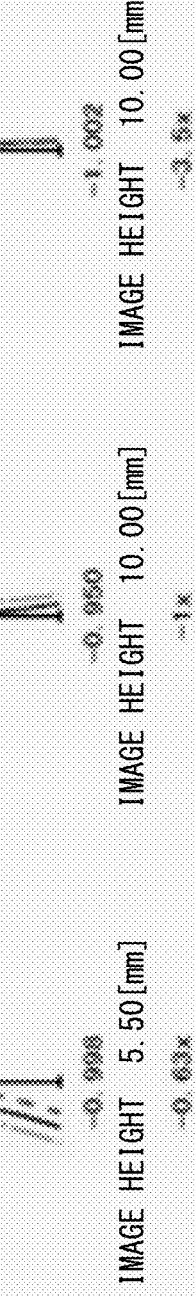

FIG. 6A to FIG. 6L illustrate aberration of the variable power relay optical system 2. FIG. 6A to FIG. 6C respectively illustrate spherical aberration in the low magnification end state, in the state of −1×, and in the high magnification end state. FIG. 6D to FIG. 6F respectively illustrate astigmatism in the low magnification end state, in the state of −1×, and in the high magnification end state. FIG. 6G to FIG. 6I respectively illustrate coma aberration in the low magnification end state, in the state of −1×, and in the high magnification end state. FIG. 6J to FIG. 6L respectively illustrate magnification chromatic aberration in the low magnification end state, in the state of −1×, and in the high magnification end state. All of the aberration diagrams illustrate that the aberration has been satisfactorily corrected. The respective aberration diagrams are depicted in a form similar to that of the aberration diagrams of the variable power relay optical system 1 according to Example 1 illustrated in FIG. 4A to FIG. 4L.

Example 3

FIG. 7A to FIG. 7C are sectional views of a variable power relay optical system 3 according to this example. FIG. 7A, FIG. 7B, and FIG. 7C illustrate the arrangement of lenses in the low magnification end state, in the state of −1×, and in the high magnification end state, respectively.

A front group FG is configured of a first lens group G1 that is configured of a meniscus lens (lens L1) with positive power that has a convex surface facing an object side, and a cemented lens CL1, in order from the objet side. The cemented lens CL1 is configured of a meniscus lens (lens L2) with positive power that has a convex surface facing the object side, and a meniscus lens (lens L3) with negative power that has a convex surface facing the object side.

A rear group RG is configured of a second lens group G2 with positive power, a third lens group G3 with negative power, which is a moving group movable along an optical axis, a fourth lens group G4 with positive power, which is a moving group movable along the optical axis, and a fifth lens group with positive power, which is movable along the optical axis, in order from the object side.

The second lens group G2 is configured of a biconvex lens (lens L4), and a cemented lens CL2 that is configured of a biconvex lens (lens L5) and a meniscus lens (lens L6) that has a concave surface facing the object side, in order from the object side.

The third lens group G3 is configured of a biconcave lens (lens L7), and a cemented lens CL3 that is configured of a biconcave lens (lens L8) and a meniscus lens (lens L9) with positive power that has a convex surface facing the object side, in order from the object side.

The fourth lens group G4 is configured of a meniscus lens (lens L10) with positive power that has a concave surface facing the object side.

The fifth lens group G5 is configured of a cemented lens CL4 that is configured of a biconcave lens (lens L11) and a biconvex lens (lens L12), and a cemented lens CL5 that is configured of a biconvex lens (lens L13) and a meniscus lens (lens L14) that has a concave surface facing the object side, in order from the object side.

The moving groups of the variable power relay optical system 3 move similarly to the moving groups of the variable power relay optical system 1 according to Example 1.

Various kinds of data of the variable power relay optical system 3 are described below.

A magnification $\beta L1$ of the first lens group, a comprehensive magnification $\beta L1\text{-}2$ of the first lens group and the second lens group, a maximum magnification $\beta MAX$ and a minimum magnification $\beta MIN$ of the variable power relay optical system 3, and an extended optical path length $\Delta L$ are respectively expressed below. The variable power relay optical system 3 satisfies expressions (1) and (2).

$\beta L1 = 0.88, \beta L1\text{-}2 = -2.12,$ $\beta MAX = -3.67, \beta MIN = -0.63,$ $\Delta L = 188.949 \text{ mm}$ Lens data of the variable power relay optical system 3 is described below.

Variable power relay optical system 3

| s | r | d | nd | vd |
|---|---|---|---|---|
| 0 | INF | 0.0 | 1.0 | |
| 1 | INF | −53.089 | 1.0 | |
| 2 | 49.394 | 5.2 | 1.49700 | 81.54 |
| 3 | 146.650 | 1 | 1.0 | |
| 4 | 29.100 | 6.8 | 1.59522 | 67.74 |
| 5 | 77.152 | 3.8 | 1.77250 | 49.60 |
| 6 | 19.149 | 27.5 | 1.0 | |
| 7 | INF | 30.614 | 1.0 | |
| 8 | 72.475 | 5.5 | 1.59522 | 67.74 |
| 9 | −26.939 | 0.4 | 1.0 | |
| 10 | 27.302 | 6.5 | 1.43875 | 94.93 |
| 11 | −20.622 | 2.5 | 1.80000 | 29.84 |
| 12 | −56.807 | D1 | 1.0 | |
| 13 | −26.680 | 1.4 | 1.48749 | 70.23 |
| 14 | 14.814 | 2.199 | 1.0 | |
| 15 | −23.311 | 1.4 | 1.51633 | 64.14 |
| 16 | 14.478 | 3.5 | 1.70154 | 41.24 |
| 17 | 283.334 | D2 | 1.0 | |
| 18 | −175.313 | 4 | 1.48749 | 70.23 |
| 19 | −31.830 | D3 | 1.0 | |
| 20 | −204.038 | 3 | 1.80810 | 22.76 |

-continued

Variable power relay optical system 3

| s | r | d | nd | vd |
|---|---|---|---|---|
| 21 | 140.417 | 6 | 1.59522 | 67.74 |
| 22 | −50.094 | 1 | 1.0 | |
| 23 | 45.693 | 9 | 1.59522 | 67.74 |
| 24 | −29.087 | 3 | 1.75500 | 52.32 |
| 25 | −94.315 | D4 | 1.0 | |
| 26 | INF | 0 | 1.0 | |

Variable values D1, D2, D3, and D4 in the low magnification end state illustrated in FIG. 7A, in the state of −1× illustrated in FIG. 7B, and in the high magnification end state illustrated in FIG. 7C are described below.

| | Magnification | | |
|---|---|---|---|
| | −0.63X | −1X | −3.67X |
| D1 | 4.0804 | 12.124 | 48.319 |
| D2 | 15.4490 | 10.318 | 3.114 |
| D3 | 37.1624 | 23.270 | 8.638 |
| D4 | 61.0335 | 72.014 | 57.654 |

FIG. 8A to FIG. 8L illustrate aberration of the variable power relay optical system 3. FIG. 8A to FIG. 8C respectively illustrate spherical aberration in the low magnification end state, in the state of −1×, and in the high magnification end state. FIG. 8D to FIG. 8F respectively illustrate astigmatism in the low magnification end state, in the state of −1×, and in the high magnification end state. FIG. 8G to FIG. 8I respectively illustrate coma aberration in the low magnification end state, in the state of −1×, and in the high magnification end state. FIG. 8J to FIG. 8L respectively illustrate magnification chromatic aberration in the low magnification end state, in the state of −1×, and in the high magnification end state. All of the aberration diagrams illustrate that the aberration has been satisfactorily corrected. The respective aberration diagrams are depicted in a form similar to that of the aberration diagrams of the variable power relay optical system 1 according to Example 1 illustrated in FIG. 4A to FIG. 4L.

Example 4

FIG. 9A to FIG. 9C are sectional views of a variable power relay optical system 4 according to this example. FIG. 9A, FIG. 9B, and FIG. 9C illustrate the arrangement of lenses in the low magnification end state, in the state of −1×, and in the high magnification end state, respectively.

A front group FG is configured of a first lens group that is configured of a meniscus lens (lens L1) with positive power that has a convex surface facing an object side, and a cemented lens CL1 in order from the object side. The cemented lens CL1 is configured of a meniscus lens (lens L2) with positive power that has a convex surface facing the object side, and a meniscus lens (lens L3) with negative power that has a convex surface facing the object side.

A rear group RG is configured of a second lens group G2 with positive power, a third lens group G3 with negative power, which is a moving group movable along an optical axis, a fourth lens group G4 with positive power, which is a moving group movable along the optical axis, and a fifth lens group G5 with positive power, which is movable along the optical axis, in order from the object side.

The second lens group G2 is a plano-convex lens (lens L4) that has a plane surface facing an object side, a biconvex lens (lens L5), and a cemented lens CL2 that is configured of a biconvex lens (lens L6) and a plano-concave lens (lens L7) that has a concave surface facing the object side, in order from the object side.

The third lens group G3 is configured of a cemented lens CL3 that is configured of a meniscus lens (lens L8) that has a concave surface facing the object side and a biconcave lens (lens L9), and a cemented lens CL4 that is configured of a biconcave lens (lens L10) and a plano-convex lens (lens L11) that has a convex surface facing the object side, in order from the object side.

The fourth lens group G4 is configured of a meniscus lens (lens S12) with positive power that has a concave surface facing the object side.

The fifth lens group G5 is configured of a cemented lens CL5 that is configured of a biconcave lens (lens L13) and a biconvex lens (lens L14), and a cemented lens CL6 that is configured of a biconvex lens (lens L15) and a meniscus lens (lens L16) that has a concave surface facing the object side, in order from the object side.

The fourth lens group G4 moves to the side of the image I1 (intermediate image I2), and then moves to the side of the relay image I3, while the magnification is changed from the low magnification end state to the high magnification end state, as illustrated in FIG. 9A to FIG. 9C. In the other points, the moving groups of the variable power relay optical system 4 move similarly to the moving groups of the variable power relay optical system 1 according to Example 1.

Various kinds of data of the variable power relay optical system 4 are described below.

A magnification $\beta L1$ of the first lens group, a comprehensive magnification $\beta L1\text{-}2$ of the first lens group and the second lens group, a maximum magnification $\beta MAX$ and a minimum magnification $\beta MIN$ of the variable power relay optical system 4, and an extended optical path length $\Delta L$ are respectively expressed below. The variable power relay optical system 4 satisfies expressions (1) and (2).

$$\beta L1 = 0.81, \beta L1\text{-}2 = -2.10,$$

$$\beta MAX = -3.48, \beta MIN = -0.63,$$

$$\Delta L = 187.99 \text{ mm}$$

Lens data of the variable power relay optical system 4 is expressed below.

Variable power relay optical system 4

| s | r | d | nd | vd |
|---|---|---|---|---|
| 0 | INF | 0.0 | 1.0 | |
| 1 | INF | −90.429 | 1.0 | |
| 2 | 26.891 | 6.5 | 1.43875 | 94.93 |
| 3 | 58.102 | 2.5 | 1.0 | |
| 4 | 28.324 | 10 | 1.60300 | 65.44 |
| 5 | 107.961 | 5.5 | 1.75500 | 52.32 |
| 6 | 13.682 | 34 | 1.0 | |
| 7 | INF | 33 | 1.0 | |
| 8 | INF | 5 | 1.43875 | 94.93 |
| 9 | −33.220 | 0.3 | 1.0 | |
| 10 | 50.273 | 5.5 | 1.43875 | 94.93 |
| 11 | −41.888 | 0.5 | 1.0 | |
| 12 | 31.656 | 7 | 1.43875 | 94.93 |
| 13 | −31.656 | 2.5 | 1.73800 | 32.26 |
| 14 | INF | D1 | 1.0 | |
| 15 | −46.096 | 3 | 1.75500 | 52.32 |

-continued

Variable power relay optical system 4

| s | r | d | nd | vd |
|---|---|---|---|---|
| 16 | −52.382 | 1.5 | 1.74100 | 52.64 |
| 17 | 30.155 | 1.532 | 1.0 | |
| 18 | −42.278 | 1.5 | 1.59522 | 67.74 |
| 19 | 20.648 | 3.2 | 1.73800 | 32.26 |
| 20 | INF | D2 | 1.0 | |
| 21 | −8115.610 | 3.5 | 1.43875 | 94.93 |
| 22 | −44.483 | D3 | 1.0 | |
| 23 | −164.406 | 2.8 | 1.73800 | 32.26 |
| 24 | 55.860 | 6 | 1.60300 | 65.44 |
| 25 | −55.860 | 1 | 1.0 | |
| 26 | 48.806 | 9 | 1.60300 | 65.44 |
| 27 | −31.390 | 3.2 | 1.75500 | 52.32 |
| 28 | −98.616 | D4 | 1.0 | |
| 29 | INF | 0 | 1.0 | |

Surface numbers s1 and s7 express image plane of the image I1 that the master optical system 10 forms, and surface number s29 expresses an image plane of the relay image I3 that the variable power relay optical system 4 forms. Surface spacings d14, d20, d22, and d28 are variable values D1, D2, D3, and D4, which vary in accordance with the variable power operation of the variable power relay optical system 4.

The variable values D1, D2, D3, and D4 in the low magnification end state illustrated in FIG. 9A, in the state of −1× illustrated in FIG. 9B, and in the high magnification end state illustrated in FIG. 9C are described below.

| | Magnification | | |
|---|---|---|---|
| | −0.63X | −1X | −3.48X |
| D1 | 5.133 | 12.793 | 52.378 |
| D2 | 28.580 | 16.330 | 2.183 |
| D3 | 32.378 | 23.790 | 12.025 |
| D4 | 63.796 | 76.974 | 63.301 |

Figures 10G, 10H, 10I:
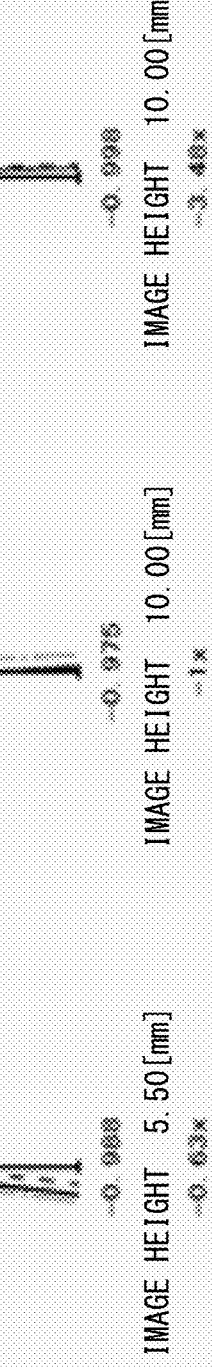

FIG. 10A to FIG. 10L illustrate aberration of the variable power relay optical system 4. FIG. 10A to FIG. 10C respectively illustrate spherical aberration in the low magnification end state, in the state of −1×, and in the high magnification end state. FIG. 10D to FIG. 10F respectively illustrate astigmatism in the low magnification end state, in the state of −1×, and in the high magnification end state. FIG. 10G to FIG. 10I respectively illustrate coma aberration in the low magnification end state, in the state of −1×, and in the high magnification end state. FIG. 10J to FIG. 10L respectively illustrate magnification chromatic aberration in the low magnification end state, in the state of −1×, and in the high magnification end state. All of the aberration diagrams illustrate that the aberration has been satisfactorily corrected. The respective aberration diagrams are depicted in a form similar to that of the aberration diagrams of the variable power relay optical system 1 according to Example 1 illustrated in FIG. 4A to FIG. 4L.

Example 5

FIG. 11A to FIG. 11C are sectional views of a variable power relay optical system 5 according to this example. FIG. 11A, FIG. 11B, and FIG. 11C illustrate the arrangement of lenses in the low magnification end state, in the state of −1×, and in the high magnification end state, respectively.

A front group FG is configured of a first lens group G1 that is configured of a cemented lens CL1 that is configured of a positive lens (lens L1) and a negative lens (lens L2) and that has a meniscus form with a concave surface facing an image side, in order from an object side.

In particular, the front group FG is configured of a first lens group G1 that is configured of a cemented lens CL1 that includes a biconvex lens (lens L1) and a biconcave lens (lens L2), in order from the object side.

A rear group RG is configured of a second lens group G2 with positive power, a third lens group G3 with negative power, which is a moving group movable along an optical axis, a fourth lens group G4 with positive power, which is a moving group movable along the optical axis, and a fifth lens group G5 with positive power, in order from the object side.

The second lens group G2 is configured of a meniscus lens (lens L3) with positive power that has a convex surface facing the side of the relay image I3, and a cemented lens that is configured of a positive lens (lens L4) and a negative lens (lens L5) and that has a biconvex shape, in order from the object side.

In particular, the second lens group G2 is configured of a meniscus lens (lens L3) with positive power that has a concave surface facing the object side, and a cemented lens CL2 that is configured of a biconvex lens (lens L4) and a meniscus lens (lens L5) that has a concave surface facing the object side, in order from the object side. The second lens group G2 is a lens group that is fixed at a fixed position regardless of magnification, as illustrated in FIG. 11A to FIG. 11C.

The third lens group G3 is configured of a negative lens (lens L6), and a cemented lens CL3 that is configured of a negative lens (lens L7) and a positive lens (lens L8) and that has a meniscus shape, in order from the object side, and has concave surfaces facing each other.

In particular, the third lens group G3 is configured of a biconcave lens (lens L6), and a cemented lens CL3 that is configured of a biconcave lens (lens L7) and a biconvex lens (lens L8), in order from the object side. The third lens group G3 moves from the side of the image I1 (intermediate image I2) to the side of the relay image I3 without reversal while magnification is changed from the low magnification end state in which the magnification is lowest to the high magnification end state in which the magnification is highest, as illustrated in FIG. 11A to FIG. 11C.

The fourth lens group G4 is configured of a cemented lens CL4 that is configured of a negative lens (lens L9) and a positive lens (lens L10), and that has a convex surface having a stronger refractive power than that of the surface on the side of the master optical system 10 on the side of the relay image I3.

In particular, the fourth lens group G4 is configured of a cemented lens CL4 that is configured of a meniscus lens (lens L9) having a convex surface facing the object side and a biconvex lens (lens L10). The fourth lens group G4 moves from the side of the relay image I3 to the side of the image I1 (intermediate image I2) without reversal, while magnification is changed from the low magnification end state in which the magnification is lowest to the high magnification end state in which the magnification is highest, as illustrated in FIG. 11A to FIG. 11C.

The fifth lens group G5 is configured of a positive lens (lens L11), and a cemented lens CL5 that is configured of a positive lens (lens L12) and a negative lens (lens L13) and that has a convex surface facing the object side, in order from the object side.

In particular, the fifth lens group G5 is configured of a plano-convex lens (lens L11) with a convex surface facing the object side, and a cemented lens CL5 that is configured of a biconvex surface (lens L12) and a plano-concave lens (lens L13) with a concave surface facing the object side, in order from the object side. The fifth lens group G5 is a lens group that is fixed at a fixed position regardless of magnification, as illustrated in FIG. 11A to FIG. 11C.

Various kinds of data of the variable power relay optical system 5 are described below.

A magnification $\beta L1$ of the first lens group, a comprehensive magnification $\beta L1-2$ of the first lens group and the second lens group, a maximum magnification $\beta MAX$ and a minimum magnification $\beta MIN$ of the variable power relay optical system 5, and an extended optical path length $\Delta L$ are respectively expressed below. The variable power relay optical system 5 satisfies expressions (1) and (2).

$$\beta L1=0.70, \beta L1-2=-1,$$

$$\beta MAX=-1.25, \beta MIN=-0.5,$$

$$\Delta L=222.731 \text{ mm}$$

Lens data of the variable power relay optical system 5 is described below.

| Variable power relay optical system 5 | | | | |
|---|---|---|---|---|
| s | r | d | nd | vd |
| 0 | INF | 0.000 | 1.0 | |
| 1 | INF | −52.832 | 1.0 | |
| 2 | 34.779 | 5.900 | 1.60311 | 60.70 |
| 3 | −99.220 | 4.000 | 1.75520 | 27.51 |
| 4 | 73.840 | 30.354 | 1.0 | |
| 5 | INF | 53.640 | 1.0 | |
| 6 | −149.600 | 3.400 | 1.71300 | 53.84 |
| 7 | −34.901 | 0.579 | 1.0 | |
| 8 | 36.574 | 5.300 | 1.48749 | 70.21 |
| 9 | −29.857 | 2.400 | 1.75520 | 27.51 |
| 10 | −78.370 | D1 | 1.0 | |
| 11 | −19.110 | 2.000 | 1.75520 | 27.51 |
| 12 | 19.110 | 3.362 | 1.0 | |
| 13 | −15.482 | 2.700 | 1.53172 | 48.91 |
| 14 | 27.718 | 4.600 | 1.74950 | 35.27 |
| 15 | −16.280 | D2 | 1.0 | |
| 16 | 150.935 | 4.000 | 1.80518 | 25.43 |
| 17 | 69.577 | 5.600 | 1.61800 | 63.39 |
| 18 | −94.281 | D3 | 1.0 | |
| 19 | 134.080 | 3.500 | 1.48749 | 70.21 |
| 20 | INF | 0.500 | 1.0 | |
| 21 | 54.286 | 5.700 | 1.48749 | 70.21 |
| 22 | −139.516 | 3.300 | 1.75520 | 27.51 |
| 23 | INF | 70.114 | 1.0 | |
| 24 | INF | 0 | 1.0 | |

Surface numbers s1 and s5 express image plane of the image I1 that the master optical system 10 forms, and surface number s24 expresses an image plane of the relay image I3 that the variable power relay optical system 5 forms. Surface spacings d10, d15, and d18 are variable values D1, D2, and D3, which vary in accordance with the variable power operation of the variable power relay optical system 5.

The variable values D1, D2, and D3 in the low magnification end state illustrated in FIG. 11A, in the state of −1× illustrated in FIG. 11B, and in the high magnification end state illustrated in FIG. 11C are described below.

| | Magnification | | |
|---|---|---|---|
| | −0.5X | −1X | −1.25X |
| D1 | 16.659 | 34.385 | 37.752 |
| D2 | 46.728 | 16.115 | 2.085 |
| D3 | 1.228 | 14.115 | 24.777 |

Example 6

FIG. 12 illustrates a configuration of an imaging apparatus 50 according to this example. The imaging apparatus 50 is a microscope apparatus that includes a microscope body 20 including the master optical system 10, the variable power relay optical system 1 according to Example 1, and a camera 30 including an imaging element 31.

The master optical system 10 is configured so as to form the image I1 by magnifying light from a sample S arranged on a stage 15 with an objective lens 12 and a tube lens 11 that are arranged respectively on both sides across a mirror unit 13. A total reflection prism 14 is means for bending an optical path, and is used so as to compactly configure the entirety of the imaging apparatus 50.

The variable power relay optical system 1 is arranged on an image side of the master optical system 10 and between the microscope body 20 (the master optical system 10) and the camera 30 (the imaging element 31). Details of the variable power relay optical system 1 are omitted because they have been described above in Example 1.

The camera 30 includes the imaging element 31 that images the relay image I3 that has been relayed by the variable power relay optical system 1.

Figure 13:
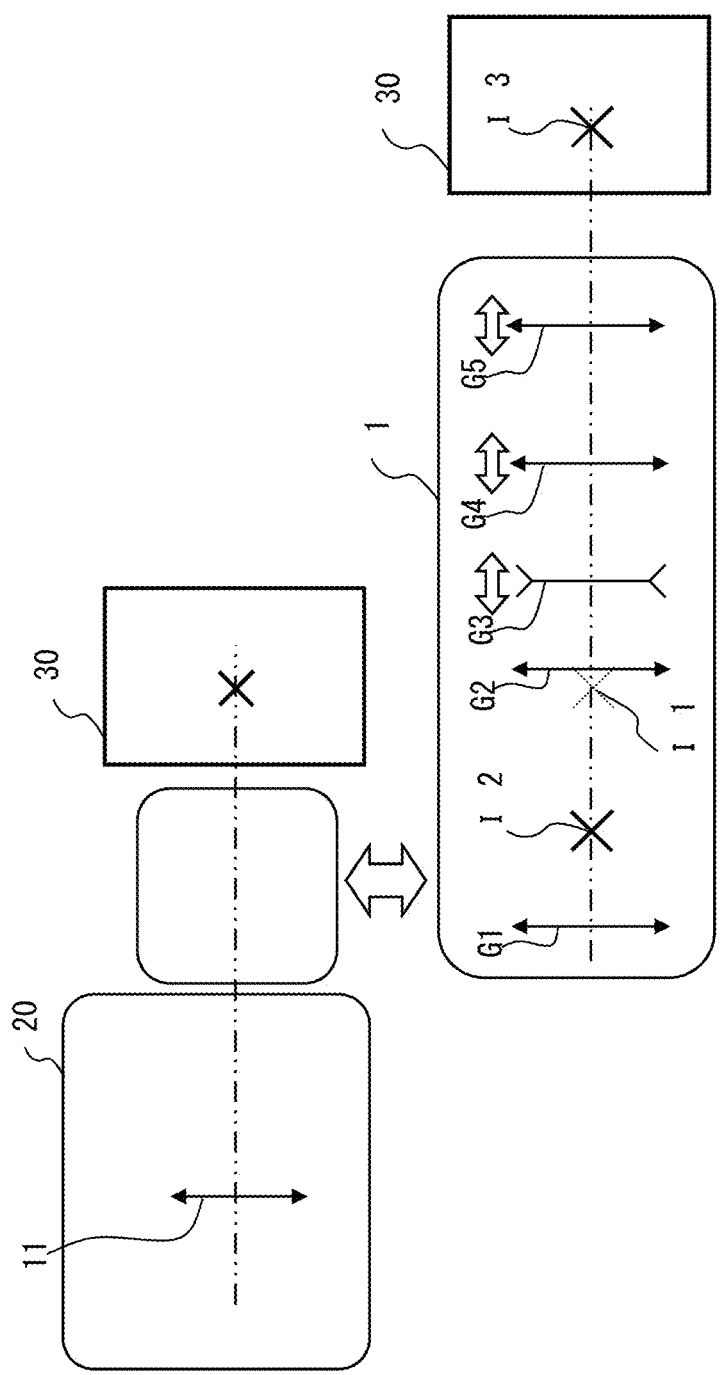
FIG. 13 illustrates an example in which a variable power relay optical system and a master optical system are separately configured.
Figure 14:
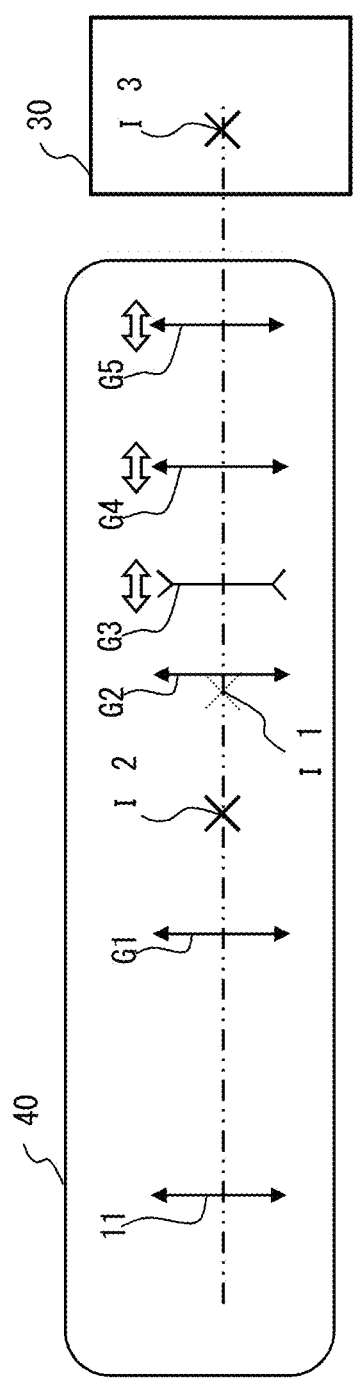
FIG. 14 illustrates an example in which a variable power relay optical system and a master optical system are integrally configured.

The imaging apparatus 50 with the configuration above enables a zoom variable power function to be provided while suppressing the extension of an optical path length. FIG. 12 illustrates an example in which the imaging apparatus 50 includes the variable power relay optical system 1 according to Example 1, but the imaging apparatus 50 may include a variable power relay optical system according to another example. The imaging apparatus 50 may be configured so as to insert as needed a variable power relay optical system between the microscope body 20 and the camera 30, as illustrated in FIG. 12 and FIG. 13, or may have a configuration 40 in which the microscope body 20 and a variable power relay optical system are integrated, as illustrated in FIG. 14.

The examples described above give specific examples in order to easily understand the invention, and the present invention is not limited to the examples above. Various modifications or variations of the variable power relay optical system and the imaging apparatus can be made without departing from the spirit of the present invention specified in the claims. As an example, a single example may be realized by combining some features in the contexts of individual examples described herein.

What is claimed is:

1. An imaging apparatus comprising, in order from an object side:
   an imaging optical system;
   a variable power relay optical system arranged on an image side of the imaging optical system; and
   an imaging element that images a relay image,
   wherein the variable power relay optical system comprises, in order from the object side:
      a front group that is arranged between the imaging optical system and a position of an image of a sample that would be formed by the imaging optical system in the absence of the variable power relay optical system, the front group forming an intermediate image formed by reducing the image; and a rear group that forms a relay image formed by magnifying the intermediate image, the rear group comprising a plurality of lens groups, and the plurality of lens groups including lens groups that are movable along an optical axis so as to change a magnification of the rear group without changing a distance from the front group to the relay image, wherein the front group comprises a first lens group having positive power, wherein the rear group comprises, in order from the object side:
 a second lens group having positive power;
 a third lens group having negative power, the third lens group being movable along the optical axis;
 a fourth lens group having positive power, the fourth lens group being movable along the optical axis; and
 a fifth lens group having positive power, the fifth lens group being movable along the optical axis, wherein the first lens group includes a meniscus lens having a convex surface on an object side of the meniscus lens, and wherein the following conditional expression is satisfied:

$$0.7 \leq \beta L1 \leq 0.9,$$

where $\beta L1$ is a magnification of the first lens group that is defined as (an image height of the intermediate image)/(an image height of the image that would be formed by the imaging optical system in the absence of the variable power relay optical system).

2. The imaging apparatus according to claim 1, wherein:
a range of a magnification of the variable power relay optical system includes −1× at which the relay image has a the same size as that of the image that would be formed by the imaging optical system in the absence of the variable power relay optical system,
while a magnitude of the magnification of the variable power relay optical system varies from a low magnification end state in which the magnitude is smallest to a high magnification end state in which the magnitude is greatest,
 the third lens group moves in a direction from the intermediate image toward the relay image, and
 the fifth lens group moves toward the relay image after moving toward the intermediate image, and
the fourth lens group is located closer to the relay image in the high magnification end state than in the low magnification end state.

3. The imaging apparatus according to claim 1, wherein:
the second lens group includes a first lens on a side of the second lens group closest to the object, the first lens having positive power,
the first lens has a convex surface on an image side thereof, the convex surface having a refractive power stronger than that of a surface on an object side of the first lens, and
the following conditional expression is satisfied:

$$1.4 \leq |\beta L1\text{-}2| \leq 2.2,$$

where $\beta L1\text{-}2$ is a comprehensive magnification of the first lens group and the second lens group.

4. The imaging apparatus according to claim 2, wherein:
the second lens group includes a first lens on a side of the second lens group closest to the object, the first lens having positive power,
the first lens has a convex surface on an image side thereof, the convex surface having a refractive power stronger than that of a surface on an object side of the first lens, and
the following conditional expression is satisfied:

$$1.4 \leq |\beta L1\text{-}2| \leq 2.2,$$

where $\beta L1\text{-}2$ is a comprehensive magnification of the first lens group and the second lens group.

5. The imaging apparatus according to claim 1, wherein the third lens group includes two lenses having concave surfaces facing each other.

6. The imaging apparatus according to claim 2, wherein the third lens group includes two lenses having concave surfaces facing each other.

7. The imaging apparatus according to claim 3, wherein the third lens group includes two lenses having concave surfaces facing each other.

8. The imaging apparatus according to claim 4, wherein the third lens group includes two lenses having concave surfaces facing each other.

9. An imaging apparatus comprising, in order from an object side:
 an imaging optical system;
 a variable power relay optical system arranged on an image side of the imaging optical system; and
 an imaging element that images a relay image,
wherein the variable power relay optical system comprises, in order from the object side:
 a front group that is arranged between the imaging optical system and a position of an image of a sample that would be formed by the imaging optical system in the absence of the variable power relay optical system, the front group forming an intermediate image formed by reducing the image; and
 a rear group that forms a relay image formed by magnifying the intermediate image, the rear group comprising a plurality of lens groups, and the plurality of lens groups including lens groups that are movable along an optical axis so as to change a magnification of the rear group without changing a distance from the front group to the relay image,
wherein the front group comprises a first lens group having positive power,
wherein the rear group comprises, in order from the object side:
 a second lens group having positive power;
 a third lens group having negative power, the third lens group being movable along the optical axis;
 a fourth lens group having positive power, the fourth lens group being movable along the optical axis; and
 a fifth lens group having positive power, the fifth lens group being movable along the optical axis,
wherein the second lens group includes a first lens on a side of the second lens group closest to the object, the first lens having positive power,
wherein the first lens has a convex surface on an image side thereof, the convex surface having a refractive power stronger than that of a surface on an object side of the first lens, and
wherein the following conditional expression is satisfied:

$$1.4 \leq |\beta L1\text{-}2| \leq 2.2,$$

where βL1-2 is a comprehensive magnification of the first lens group and the second lens group, and is defined as (an image height of a relay image formed by the first lens group and the second lens group)/(an image height of the image that would be formed by the imaging optical system in the absence of the variable power relay optical system).

10. The imaging apparatus according to claim 9, wherein:
a range of a magnification of the variable power relay optical system includes −1× at which the relay image has a the same size as that of the image that would be formed by the imaging optical system in the absence of the variable power relay optical system,
while a magnitude of the magnification of the variable power relay optical system varies from a low magnification end state in which the magnitude is smallest to a high magnification end state in which the magnitude is greatest,
the third lens group moves in a direction from the intermediate image toward the relay image, and
the fifth lens group moves toward the relay image after moving toward the intermediate image, and
the fourth lens group is located closer to the relay image in the high magnification end state than in the low magnification end state.

11. The imaging apparatus according to claim 9, wherein the third lens group includes two lenses having concave surfaces facing each other.

12. The imaging apparatus according to claim 10, wherein the third lens group includes two lenses having concave surfaces facing each other.

* * * * *